United States Patent
Lee et al.

(10) Patent No.: US 7,856,633 B1
(45) Date of Patent: Dec. 21, 2010

(54) LRU CACHE REPLACEMENT FOR A PARTITIONED SET ASSOCIATIVE CACHE

(75) Inventors: Chan W. Lee, Portland, OR (US); Glenn Hinton, Portland, OR (US); Robert Krick, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/534,191

(22) Filed: Mar. 24, 2000

(51) Int. Cl.
*G06F 9/46* (2006.01)
*G06F 13/00* (2006.01)

(52) U.S. Cl. .................. 718/105; 711/129; 711/136

(58) Field of Classification Search ............ 709/100, 709/102, 104, 107, 108; 711/100, 101, 117, 711/118, 129, 136; 718/105
See application file for complete search history.

(56) References Cited

U.S. PATENT DOCUMENTS

| | | | |
|---|---|---|---|
| 3,771,138 A | 11/1973 | Celtruda et al. | |
| 5,167,024 A | 11/1992 | Smith et al. | |
| 5,228,131 A | 7/1993 | Ueda et al. | |
| 5,325,526 A | 6/1994 | Cameron et al. | |
| 5,337,285 A | 8/1994 | Ware et al. | |
| 5,357,617 A | 10/1994 | Davis et al. | |
| 5,361,337 A | 11/1994 | Okin | |
| 5,386,561 A | 1/1995 | Huynh et al. | |
| 5,392,437 A | 2/1995 | Matter et al. | |
| 5,404,469 A | 4/1995 | Chung et al. | 395/375 |
| 5,428,810 A | 6/1995 | Barkans et al. | |
| 5,430,850 A | 7/1995 | Papadopoulos et al. | 395/375 |

(Continued)

FOREIGN PATENT DOCUMENTS

EP      0 346 003      12/1989

(Continued)

OTHER PUBLICATIONS

Dongwook K et al: "A Partitioned on-Chip Virtual Cache for Fast Processors" Journal of Systems Architecture, Elsevier Science Publishers BV., Amsterdam, NL, vol. 43, No. 8, May 1, 1997, pp. 519-531, XP000685730.

(Continued)

*Primary Examiner*—Li B Zhen
*Assistant Examiner*—Brian Chew
(74) *Attorney, Agent, or Firm*—Blakely, Sokoloff, Taylor & Zafman LLP

(57) ABSTRACT

A method of partitioning a memory resource, associated with a multi-threaded processor, includes defining the memory resource to include first and second portions that are dedicated to the first and second threads respectively. A third portion of the memory resource is then designated as being shared between the first and second threads. Upon receipt of an information item, (e.g., a microinstruction associated with the first thread and to be stored in the memory resource), a history of Least Recently Used (LRU) portions is examined to identify a location in either the first or the third portion, but not the second portion, as being a least recently used portion. The second portion is excluded from this examination on account of being dedicated to the second thread. The information item is then stored within a location, within either the first or the third portion, identified as having been least recently used.

35 Claims, 15 Drawing Sheets

U.S. PATENT DOCUMENTS

| | | | |
|---|---|---|---|
| 5,454,117 A | 9/1995 | Puziol et al. | |
| 5,473,572 A | 12/1995 | Margeson, III | |
| 5,495,617 A | 2/1996 | Yamada | |
| 5,499,349 A | 3/1996 | Nikhil et al. | 395/375 |
| 5,511,198 A | 4/1996 | Hotta | |
| 5,524,263 A | 6/1996 | Griffth et al. | 395/800 |
| 5,528,513 A | 6/1996 | Vaitzblit et al. | |
| 5,553,291 A | 9/1996 | Tanaka et al. | |
| 5,586,332 A | 12/1996 | Jain et al. | |
| 5,590,061 A | 12/1996 | Hollowell, II et al. | |
| 5,623,471 A | 4/1997 | Prigge | |
| 5,630,130 A | 5/1997 | Perotto et al. | |
| 5,632,038 A | 5/1997 | Fuller | |
| 5,701,448 A | 12/1997 | White | |
| 5,740,417 A | 4/1998 | Kennedy et al. | |
| 5,742,782 A | 4/1998 | Ito et al. | |
| 5,761,522 A | 6/1998 | Hisanaga et al. | |
| 5,787,297 A | 7/1998 | Lin | |
| 5,799,180 A | 8/1998 | Shiell et al. | |
| 5,809,271 A | 9/1998 | Colwell et al. | 395/384 |
| 5,809,522 A | 9/1998 | Novak et al. | |
| 5,854,922 A | 12/1998 | Gravenstein et al. | |
| 5,872,965 A | 2/1999 | Petrick | |
| 5,875,464 A * | 2/1999 | Kirk | 711/129 |
| 5,880,979 A | 3/1999 | Mennemeier et al. | |
| 5,892,959 A | 4/1999 | Fung | |
| 5,900,025 A | 5/1999 | Sollars | |
| 5,968,160 A | 10/1999 | Saito et al. | |
| 5,968,167 A | 10/1999 | Whittaker et al. | |
| 5,983,339 A | 11/1999 | Klim | |
| 5,996,083 A | 11/1999 | Gupta et al. | |
| 5,996,085 A | 11/1999 | Cheong et al. | |
| 5,999,932 A | 12/1999 | Paul | |
| 5,999,963 A * | 12/1999 | Bruno et al. | 709/104 |
| 6,009,454 A | 12/1999 | Dummermuth | |
| 6,035,374 A | 3/2000 | Panwar et al. | |
| 6,052,708 A | 4/2000 | Flynn et al. | |
| 6,052,709 A | 4/2000 | Paul | |
| 6,085,215 A | 7/2000 | Ramakrishnan et al. | |
| 6,085,218 A | 7/2000 | Carmon | |
| 6,088,788 A | 7/2000 | Borkenhagen et al. | |
| 6,092,175 A | 7/2000 | Levy et al. | 712/23 |
| 6,105,127 A | 8/2000 | Kimura et al. | 712/215 |
| 6,115,709 A | 9/2000 | Gilmour et al. | |
| 6,161,167 A * | 12/2000 | Witt | 711/136 |
| 6,182,210 B1 | 1/2001 | Akkary et al. | |
| 6,205,519 B1 * | 3/2001 | Aglietti et al. | 711/133 |
| 6,212,544 B1 | 4/2001 | Borkenhagen et al. | |
| 6,233,599 B1 | 5/2001 | Nation et al. | |
| 6,247,121 B1 | 6/2001 | Akkary et al. | |
| 6,256,775 B1 | 7/2001 | Flynn | |
| 6,272,517 B1 * | 8/2001 | Yue et al. | 709/102 |
| 6,289,461 B1 | 9/2001 | Dixon | |
| 6,295,580 B1 * | 9/2001 | Sturges et al. | 711/129 |
| 6,308,279 B1 | 10/2001 | Toll et al. | |
| 6,314,530 B1 | 11/2001 | Mann | |
| 6,330,584 B1 | 12/2001 | Joffe et al. | |
| 6,353,844 B1 * | 3/2002 | Bitar et al. | 709/102 |
| 6,357,016 B1 | 3/2002 | Rodgers et al. | |
| 6,366,945 B1 * | 4/2002 | Fong et al. | 709/104 |
| 6,374,286 B1 * | 4/2002 | Gee et al. | 709/108 |
| 6,381,682 B2 * | 4/2002 | Noel et al. | 711/153 |
| 6,389,449 B1 | 5/2002 | Nemirovsky et al. | |
| 6,430,593 B1 | 8/2002 | Lindsley | |
| 6,442,585 B1 * | 8/2002 | Dean et al. | 709/108 |
| 6,470,376 B1 | 10/2002 | Tanaka et al. | |
| 6,493,800 B1 * | 12/2002 | Blumrich | 711/129 |
| 6,496,925 B1 | 12/2002 | Rodgers et al. | |
| 6,535,905 B1 * | 3/2003 | Kalafatis et al. | 709/108 |
| 6,542,921 B1 * | 4/2003 | Sager | 709/108 |
| 6,625,635 B1 | 9/2003 | Elnozahy | |
| 6,697,935 B1 | 2/2004 | Borkenhagen et al. | |
| 6,789,181 B1 | 9/2004 | Yates et al. | |
| 6,889,319 B1 | 5/2005 | Rodgers et al. | |
| 7,039,794 B2 | 5/2006 | Rodgers et al. | |
| 2001/0004755 A1 | 6/2001 | Levy et al. | |
| 2002/0013892 A1 | 1/2002 | Gorishek et al. | |
| 2002/0062435 A1 | 5/2002 | Nemirovsky et al. | |
| 2002/0091914 A1 | 7/2002 | Merchant et al. | |
| 2002/0116600 A1 | 8/2002 | Smith et al. | |
| 2003/0009648 A1 | 1/2003 | Doing et al. | |
| 2003/0023835 A1 | 1/2003 | Kalafatis et al. | |

FOREIGN PATENT DOCUMENTS

| | | |
|---|---|---|
| EP | 0 352 935 | 1/1990 |
| EP | 0 725 335 | 8/1996 |
| EP | 0 747 816 | 12/1996 |
| EP | 0747816 | 12/1996 |
| EP | 0 768 608 A2 | 4/1997 |
| EP | 0 768 608 A3 | 4/1997 |
| EP | 0 827 071 | 3/1998 |
| EP | 0864960 A1 | 3/1998 |
| EP | 0 856 797 A1 | 8/1998 |
| EP | 0 863 462 | 9/1998 |
| EP | 0 962 856 A2 | 5/1999 |
| GB | 2311880 A | 10/1997 |
| JP | 11066849 | 3/1999 |
| RU | 2029359 C1 | 2/1995 |
| RU | 2110089 C1 | 4/1998 |
| WO | WO 99/21081 | 4/1999 |
| WO | WO 99/21082 | 4/1999 |
| WO | WO99/21088 | 4/1999 |
| WO | WO 99/21089 | 4/1999 |
| WO | PCT/US00/28213 | 10/2000 |
| WO | PCT/US00/28421 | 10/2000 |
| WO | PCT/US00/28422 | 10/2000 |

OTHER PUBLICATIONS

PCT-International Search Report-PCT/US01/01577, Sep. 10, 2001.

Dean M. Tullsen,et al. "Exploiting Choice: Instruction Fetch and Issue on an Implementable Simultaneous Multihreading Processor" Dept. of Computer Science & Engineering, University of WA, Seattle, WA.

Roa P. Pokala,et al., "Physical Synthesis for Performance Optimization", Vertex Semiconductor, San Jose, CA.

Gregory T. Byrd, et al., "Multithreaded Processor Architectures", Western Carolina University, 8045 IEEE Spectrum, 32(1995) Aug. No. 8, New York, US.

Mark R. Thistle, et al., "A Processor Architecture for Horizon", Institute for Defense Analyses, Supercomputing Research Center, Lanham, Maryland 20706.

PCT Written Opinion, Apr. 26, 2001, PCT/US00/10800.

Steere D et al.., "A Feedback-driven Proportion Allocator for Real-Rate Scheduling", *Third Symposium on Operating Systems Design and Implementations*, Feb. 22-25, 1999, pp. 145-158, XP002153159.

INTEL, "P6 Family of Processors", *Hardware Developer's Manual*, Sep. 1998, XP-002153160.

IBM, "Improved Dispatching in a Rendering Context Manager" *IBM Technical Disclosure Bulletin*, Dec. 1990, pp. 131-134, vol. 33, No. 7, XP000108363 ISSN: 0018-8689, Armonk, NY.

Farrens, MK; Pleszkun, AR., "Strategies for Achieving Improved Processor Throughput" *The 18th Annual International Symposium on Computer Architecture*, May 27-30, 1991, pp. 362-369.

Mendelson,A; Bekerman, M., "Design Alternatives of Multithreaded Architecture", *International Journal of Parallel Programming*, Dec. 9, 1996, vol. 27, No. 3, pp. 161-193, Pulenum Publishing Corporation.

"Architectural and Implementation Tradeoffs in the Design of Multiple-Context Processors", James Laudon, Anoop Gupta and Mark Horowitz, Multithreaded Computer Architecture: A Summary of the State of the Art, chapter 8, pp. 167-200, Kluwer Academic Publishers 1994.

"Multithreading for Rookies", Ruediger R. Asche, http://www.microsoft.com/win32dev/base/threads.htm, Jul. 31, 1998.

"Performance Study of a Multithreaded Superscalar Microprocessor", Manu Gulati and Nader Bagherzadeh, Proceedings Second International Symposium on High-Performance Computer Architecture, Feb. 3-7, 1996, pp. 291-301.

"Exploiting Choice: Instruction Fetch and Issue on an Implementable Simultaneous Multithreading Processor", Dean M. Tullsen, Susan J. Eggers, Joel S. Emer, Henry M. Levy, Jack L. Lo and Rebecca L. Stammm, Proceedings of the 23rd Annual International Symposium on Computer Architecture, May 22-24, 1996, pp. 191-202.

"Instruction Cache Fetch Policies for Speculative Execution", Dennis Lee, Jean-Loup Baer, Brad Calder and Dirk Grunwald, 22nd International Symposium on Computer Architecture, Jun. 1995.

"Multithreading Comes of Age", Peter Song, Microdesign Resources, Jul. 14, 1997, pp. 13-18.

"Evaluation of Multithreaded Uniprocessors for Commercial Application Environments", Richard J . Eickemeyer, Ross E. Johnson, Steven R. Kunkel, Mark S. Squillante and Shiafun Liu, Proceedings of the 23rd Annual International Symposium on Computer Architecture. May 22-24, 1996, pp. 203-212.

Simon W. Moore, Multithreaded Processor Design, Kluwer Academic Publishers, 1996.

"A Benchmark Evaluation of a Multi-Threaded RISC Processor Architecture", R. Guru Prasadh and Chuan-lin Wu, 1991 International Conference on Parallel Processing, pp. I-84-I91.

Chinese Office Action Issued Jan. 23, 2009 for Chinese Application No. 01809728.6, 5 pages, Chinese Office Action Issued Apr. 18, 2008 for Chinese Application No. 01809728.6, 16 pages.

International Preliminary Examination Report issued Feb. 22, 2002 for PCT Application No. PCT/US2001/01577, 4 pages.

PCT Written Opinion, PCT/US01/01577, 5 pages, Nov. 9, 2001.

PCT International Search Report, PCT/US00/10800, 7 pages, Feb. 20, 2001.

PCT International Preliminary Examination Report, PCT/US00/10800, 4 pages, Nov. 15, 2001.

PCT International Search Report, PCT/US00/28421, 6 pages, Feb. 2, 2001.

PCT International Preliminary Examination Report, PCT/US00/28421, 4 pages, Sep. 28, 2001.

PCT International Search Report, PCT/US00/28213, 6 pages, Sep. 14, 2001.

PCT International Preliminary Examination Report, PCT/US00/28213, Sep. 26, 2001.

PCT Written Opinion, PCT/US00/17664, 4 pages, Apr. 4, 2001.

PCT International Search Report, PCT/US00/17664, 7 pages, Nov. 30, 2000.

PCT International Preliminary Examination Report, PCT/US00/17664, 4 pages, Aug. 16, 2001.

PCT International Preliminary Examination Report, PCT/US00/28422, 4 pages, Sep. 26, 2002.

PCT International Search Report, PCT/US00/28422, 7 pages, Sep. 26, 2001.

PCT International Search Report, PCT/US00/32241, 7 pages, Mar. 23, 2001.

PCT Written Opinion, PCT/US00/32241, 4 pages, Sep. 14, 2001.

PCT International Preliminary Examination Report, PCT/US00/32241, 4 pages, Oct. 23, 2002.

Rosenberg Dictionary of Computers, Information Processing and Telecommunications, pp. 299-300, 1987.

Rosenberg Dictionary of Computers, Information Processing and Telecommunications, 2nd Ed., p. 7, 1987.

Agarwal, A., et al., "April: A Processor Architecture for Multiprocessing", Proceedings of the 17th Annual International Symposium on Computer Architecture, pp. 104-114. 1990.

Zilles, C., et al., "The Use of Multithreading for Exception Handling", Proceedings of the 32nd Annual Symposium on Microarchitecture, IEEE, pp. 219-229. 1990.

Miyake, J., et al., "A Highly Integrated 40-MIPS (Peak) 64-b RISC Microprocessor", IEEE Journal of SolidState Circuits, vol. 25, No. 5, Oct. 1990.

Eggers, S., et al., "Simultaneous Multithreading: A Platform for Next-Generation Processors", IEEE Micro, pp. 12-19, Sep./Oct. 1997.

Tullsen, D., et al., "Simultaneous Multithreading: Maximizing On-Chip Parallelism", Proceedings of the 22nd Annual International Symposium on Computer Architecture, 12 pgs., Jun. 1995.

Amamiya, M., et al., "Datarol: A Parallel Machine Architecture for Fine-Grain Multithreading", IEEE 1998, pp. 151-162.

Ortiz, D., et al., "A Preliminary Study of Architectural Support for Multithreading", IEEE 1997, pp. 227233.

Jonsson, J., et al., "Non-Preemptive Scheduling of Real-Time Threads on Multi-level-Context Architecture", IEEE Workshop on Parallel and Distributed Systems, Apr. 12-13, 1999, pp. 1-26.

Chinese Office Action issued Dec. 19, 2003 for Chinese Application No. 01809728.6, 15 pages.

Chinese Office Action issued Sep. 22, 2006 for Chinese Application No. 01809728.6, 8 pages.

Chinese Office Action issued Aug. 21, 2009 for Chinese Application No. 01809728.6, 7 pages.

German Office Action issued Feb. 28, 2005 for German Application No. 100 85 363.3-53, 11 pages.

German Office Action issued Oct. 17, 2005 for German Application No. 100 85 363.3-53, 4 pages.

UK Office Action issued Oct. 28, 2003 for UK Application No. GB 0215189.2, 4 pages.

European Office Action issued May 4, 2004 for European Application No. 00 926 240.3-2211, 3 pages.

European Office Action issued Oct. 31, 2005 for European Application No. 00 970 828.0-1243, 6 pages.

Chinese Office Action issued Dec. 26, 2003 for Chinese Application No. 00818829.7, 10 pages.

Chinese Office Action issued Apr. 2, 2004 for Chinese Application No. 00818829.7, 8 pages.

Chinese Office Action issued Jan. 30, 2004 for Chinese Application No. 00818879.3, 11 pages.

Chinese Office Action issued Aug. 25, 2006 for Chinese Application No. 200510007035.9, 2 pages. (English translation only).

Russian Office Action issued Sep. 10, 2003 for Russian Application No. 2002118211, 5 pages.

UK Office Action issued Feb. 26, 2004 for UK Application No. GB 0224460.6, 3 pages.

Taiwanese Office Action issued Feb. 20, 2003 for Taiwan Application No. 089128138, 3 pages.

Taiwanese Office Action issued Oct. 2, 2002 for Taiwan Application No. 090106484, 3 pages.

Taiwanese Office Action issued Oct. 31, 2003 for Taiwan Application No. 090106484, 3 pages.

Taiwanese Office Action issued Jul. 23, 2004 for Taiwan Application No. 090106484, 3 pages.

Chinese Office Action issued Jan. 16, 2004 for Chinese Application No. 00809404.7, 34 pages.

Chinese Office Action issued Jun. 11, 2004 for Chinese Application No. 00809404.7, 12 pages.

Korean Notice of Preliminary Rejection issued Sep. 15, 2004 for Korean Application No. 10-20027007314, 3 pages.

Korean Notice of Preliminary Rejection issued Mar. 28, 2005 for Korean Application No. 10-2002-7007314, 4 pages.

European Office Action issued May 20, 2005 for European Application No. 00 970 896.7-2211, 5 pages.

UK Office Action issued Jun. 24, 2003 for UK Application No. GB 0200078.4, 3 pages.

European Office Action issued Dec. 22, 2006 for European Application No. 00 970 895.6-1243, 3 pages.

Chinese Office Action issued Mar. 18, 2005 for Chinese Application No. 00818830.0, 15 pages.

Chinese Office Action issued Apr. 20, 2007 for Chinese Application No. 200610002572.9, 7 pages.

Indian Office Action issued Apr. 29, 2004 for Indian Application No. IN/PCT/2002/00742/MUM, 9 pages.

Indian Office Action issued Apr. 23, 2004 for Indian Application No. IN/PCT/2002/00743/MUM, 9 pages.

Indian Office Action issued Sep. 19, 2006 for Indian Application No. 355/MUMNP/2005, 2 pages.
Indian Office Action issued Jan. 19, 2004 for Indian Application No. IN/PCT/2001/01337/MUM, 6 pages.
Indian Office Action issued May 7, 2004 for Indian Application No. IN/PCT/2002/00741/MUM, 2 pages.
Israel Office Action issued Dec. 18, 2005 for Israel Application No. 146,159, 5 pages.

German Office Action issued Mar. 23, 2005 for German Application No. 101 95 962.1-53, 9 pages.
German Office Action issued Aug. 7, 2009 for German Application No. 101 95 962.1-53, 6 pages.
German Office Action issued Jul. 28, 2005 for German Application No. 100 84 804.4-53, 8 pages.

* cited by examiner

LRU CACHE REPLACEMENT FOR A PARTITIONED SET ASSOCIATIVE CACHE

FIELD OF THE INVENTION

The present invention relates generally to the field of multi-threaded processors and, more specifically, to a method and apparatus for partitioning a processor resource within a multi-threaded processor.

BACKGROUND OF THE INVENTION

Multi-threaded processor design has recently been considered as an increasingly attractive option for increasing the performance of processors. Multithreading within a processor, inter alia, provides the potential for more effective utilization of various processor resources, and particularly for more effective utilization of the execution logic within a processor. Specifically, by feeding multiple threads to the execution logic of a processor, clock cycles that would otherwise have been idle due to a stall or other delay in the processing of a particular thread may be utilized to service another thread. A stall in the processing of a particular thread may result from a number of occurrences within a processor pipeline. For example, a cache miss or a branch misprediction (i.e., a long-latency operation) for an instruction included within a thread typically results in the processing of the relevant thread stalling. The negative effect of long-latency operations on execution logic efficiencies is exacerbated by the recent increases in execution logic throughput that have outstripped advances in memory access and retrieval rates.

Multi-threaded computer applications are also becoming increasingly common in view of the support provided to such multi-threaded applications by a number of popular operating systems, such as the Windows NT® and Unix operating systems. Multi-threaded computer applications are particularly efficient in the multi-media arena.

Multi-threaded processors may broadly be classified into two categories (i.e., fine or coarse designs) according to the thread interleaving or switching scheme employed within the relevant processor. Fine multi-threaded designs support multiple active threads within a processor and typically interleave two different threads on a cycle-by-cycle basis. Coarse multi-threaded designs typically interleave the instructions of different threads on the occurrence of some long-latency event, such as a cache miss. A coarse multi-threaded design is discussed in Eickemayer, R.; Johnson, R.; et al., "Evaluation of Multithreaded Uniprocessors for Commercial Application Environments", *The 23rd Annual International Symposium on Computer Architecture*, pp. 203-212, May 1996. The distinctions between fine and coarse designs are further discussed in Laudon, J; Gupta, A, "Architectural and Implementation Tradeoffs in the Design of Multiple-Context Processors", *Multithreaded Computer Architectures: A Summary of the State of the Art*, edited by R. A. Iannuci et al., pp. 167-200, Kluwer Academic Publishers, Norwell, Mass., 1994. Laudon further proposes an interleaving scheme that combines the cycle-by-cycle switching of a fine design with the full pipeline interlocks of a coarse design (or blocked scheme). To this end, Laudon proposes a "back off" instruction that makes a specific thread (or context) unavailable for a specific number of cycles. Such a "back off" instruction may be issued upon the occurrence of predetermined events, such as a cache miss. In this way, Laudon avoids having to perform an actual thread switch by simply making one of the threads unavailable.

Where resource sharing is implemented within a multi-threaded processor (i.e., there is limited or no duplication of function units for each thread supported by the processor) it is desirable to effectively share resources between the threads.

BRIEF DESCRIPTION OF THE DRAWINGS

The present invention is illustrated by way of example and not limited in the figures of the accompanying drawings, in which like references indicate similar elements and in which.

DETAILED DESCRIPTION

A method and apparatus for partitioning a processor resource within a multi-threaded processor are described. In the following description, for purposes of explanation, numerous specific details are set forth in order to provide a thorough understanding of the present invention. It will be evident, however, to one skilled in the art that the present invention may be practiced without these specific details.

For the purposes of the present specification, the term "event" shall be taken to include any event, internal or external to a processor, that causes a change or interruption to the servicing of an instruction stream (macro- or micro-instruction) within a processor. Accordingly, the term "event" shall be taken to include, but not limited to, branch instructions, exceptions and interrupts that may be generated within or outside the processor.

For the purposes of the present specification, the term "processor" shall be taken to refer to any machine that is capable of executing a sequence of instructions (e.g., macro- or micro-instructions), and shall be taken to include, but not be limited to, general purpose microprocessors, special purpose microprocessors, graphics controllers, audio controllers, multi-media controllers and microcontrollers. Further, the term "processor" shall be taken to refer to, inter alia, Complex Instruction Set Computers (CISC), Reduced Instruction Set Computers (RISC), or Very Long Instruction Word (VLIW) processors.

For the purposes of the present specification, the term "resource" shall be taken to include any unit, component or module of a processor, and shall be taken to include, but not be limited to, a memory resource, a processing resource, a buffering resource, a communications resource or bus, a sequencing resource or a translating resource.

Processor Pipeline

Figure 1:
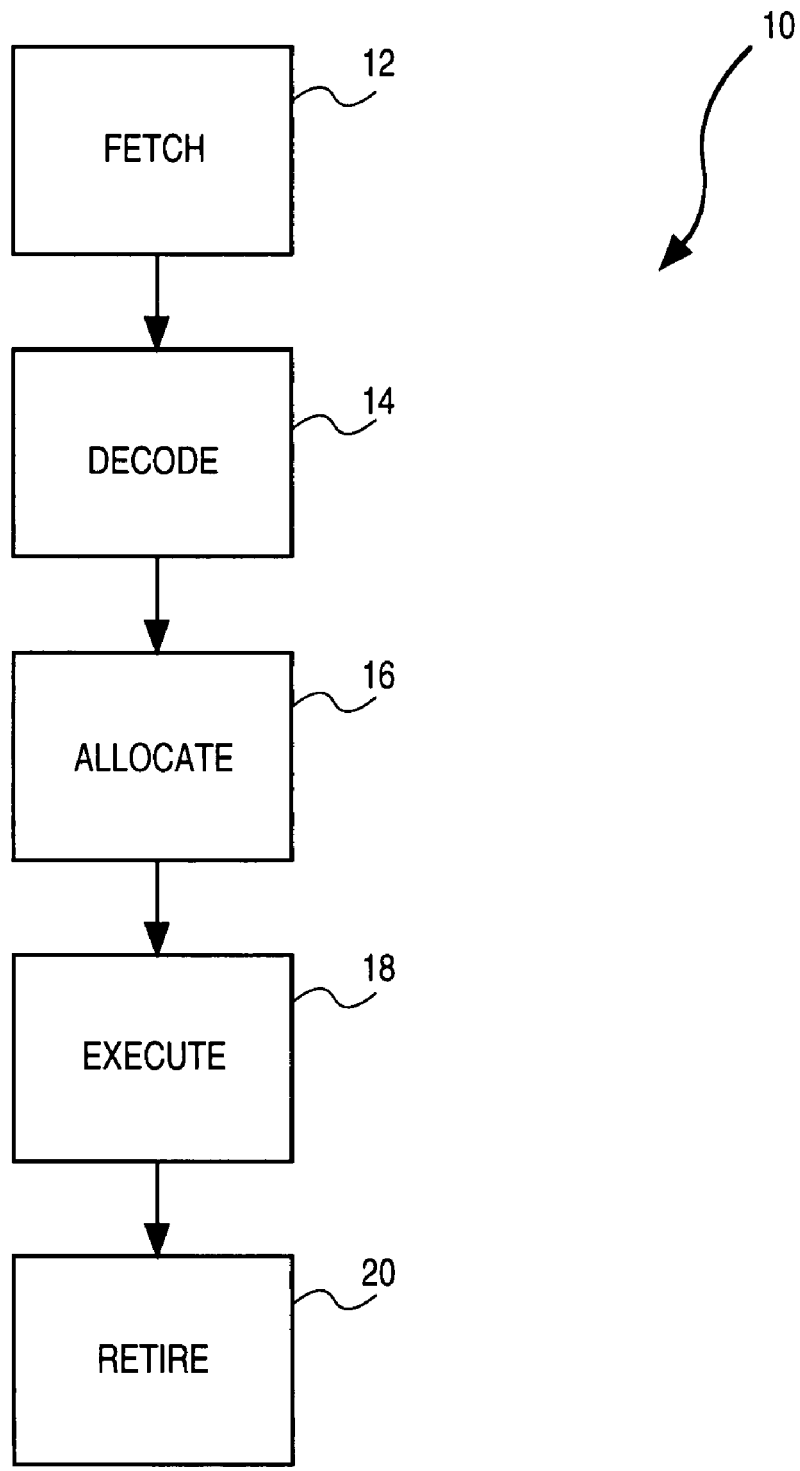
FIG. 1 is a block diagram illustrating an exemplary pipeline of a processor within which the present invention may be implemented.

FIG. 1 is a high-level block diagram illustrating an exemplary embodiment of processor pipeline 10 within which the present invention may be implemented. The pipeline 10 includes a number of pipe stages, commencing with a fetch pipe stage 12 at which instructions (e.g., macroinstructions) are retrieved and fed into the pipeline 10. For example, a macroinstruction may be retrieved from a cache memory that is integral with the processor, or closely associated therewith, or may be retrieved from an external main memory via a processor bus. From the fetch pipe stage 12, the macroinstructions are propagated to a decode pipe stage 14, where macroinstructions are translated into microinstructions (also termed "microcode") suitable for execution within the processor. The microinstructions are then propagated downstream to an allocate pipe stage 16, where processor resources are allocated to the various microinstructions according to availability and need. The microinstructions are then executed at an execute stage 18 before being retired, or "written-back" (e.g., committed to an architectural state) at a retire pipe stage 20.

Microprocessor Architecture

Figure 2:
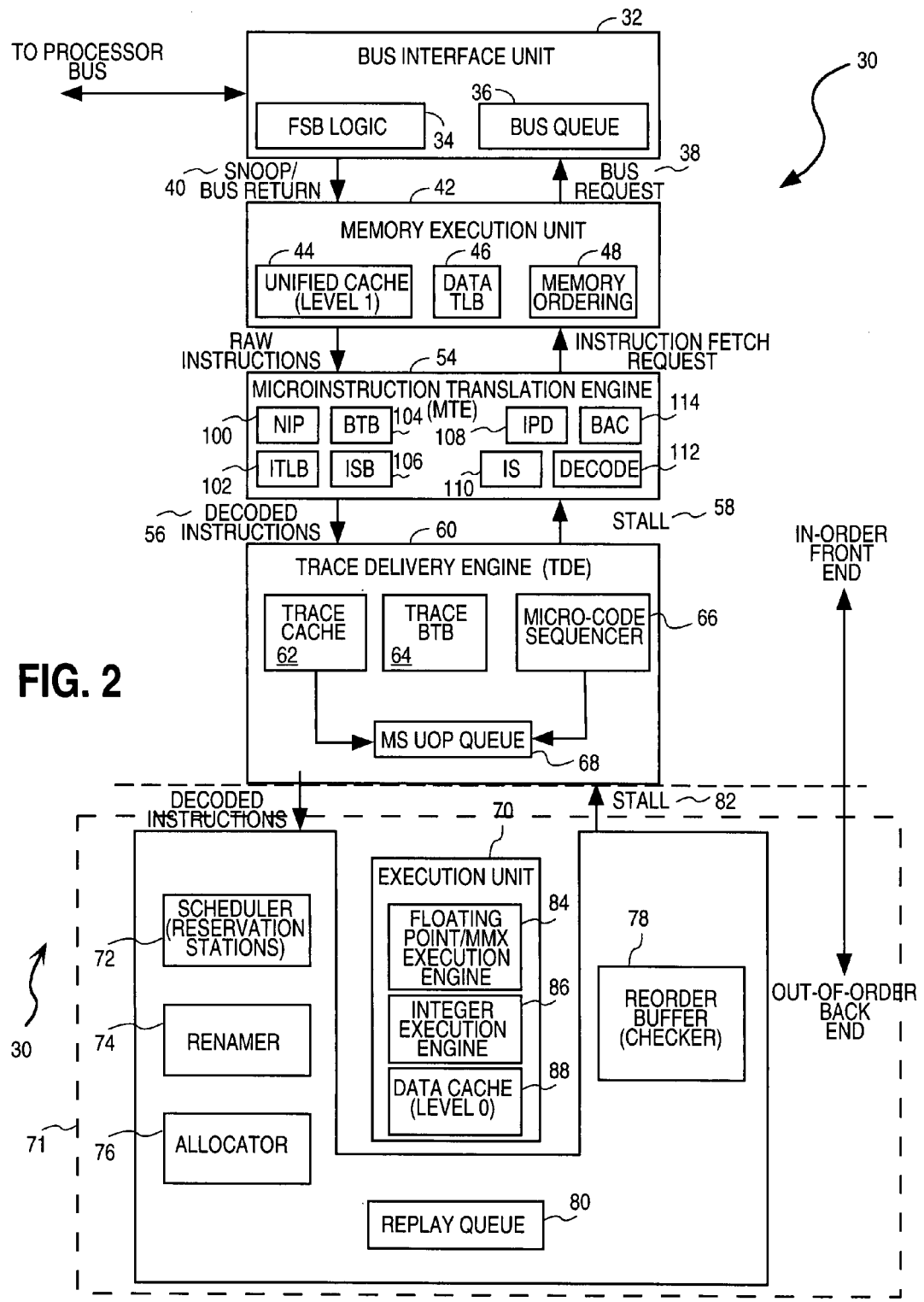
FIG. 2 is a block diagram illustrating an exemplary embodiment of a processor, in the form of a general-purpose multi-threaded microprocessor, within which the present invention may be implemented.

FIG. 2 is a block diagram illustrating an exemplary embodiment of a processor 30, in the form of a general-purpose microprocessor, within which the present invention may be implemented. The processor 30 is described below as being a multi-threaded (MT) processor, and is accordingly able simultaneously to process multiple instruction threads (or contexts). However, a number of the teachings provided below in the specification are not specific to a multi-threaded processor, and may find application in a single threaded processor. In an exemplary embodiment, the processor 30 may comprise an Intel Architecture (IA) microprocessor that is capable of executing the Intel Architecture instruction set. An example of such an Intel Architecture microprocessor is the Pentium Pro® microprocessor or the Pentium III® microprocessor manufactured by Intel Corporation of Santa Clara, Calif.

The processor 30 comprises an in-order front end and an out-of-order back end. The in-order front end includes a bus interface unit 32, which functions as the conduit between the processor 30 and other components (e.g., main memory) of a computer system within which the processor 30 may be employed. To this end, the bus interface unit 32 couples the processor 30 to a processor bus (not shown) via which data and control information may be received at and propagated from the processor 30. The bus interface unit 32 includes Front Side Bus (FSB) logic 34 that controls communications over the processor bus. The bus interface unit 32 further includes a bus queue 36 that provides a buffering function with respect to communications over the processor bus. The bus interface unit 32 is shown to receive bus requests 38 from, and to send snoops or bus returns 40 to, a memory execution unit 42 that provides a local memory capability within the processor 30. The memory execution unit 42 includes a unified data and instruction cache 44, a data Translation Lookaside Buffer (TLB) 46, and memory ordering buffer 48. The memory execution unit 42 receives instruction fetch requests from, and delivers raw instructions (i.e., coded macroinstructions) to, a microinstruction translation engine 54 that translates the received macroinstructions into a corresponding set of microinstructions.

The microinstruction translation engine 54 effectively operates as a trace cache "miss handler" in that it operates to deliver microinstructions to a trace cache 62 in the event of a trace cache miss. To this end, the microinstruction translation engine 54 functions to provide the fetch and decode pipe stages 12 and 14 in the event of a trace cache miss. The microinstruction translation engine 54 is shown to include a next instruction pointer (NIP) 100, an instruction Translation Lookaside Buffer (TLB) 102, a branch predictor 104, an instruction streaming buffer 106, an instruction pre-decoder 108, instruction steering logic 110, an instruction decoder 112, and a branch address calculator 114. The next instruction pointer 100, TLB 102, branch predictor 104 and instruction streaming buffer 106 together constitute a branch prediction unit (BPU). The instruction decoder 112 and branch address calculator 114 together comprise an instruction translate (IX) unit.

The next instruction pointer 100 issues next instruction requests to the unified cache 44. In the exemplary embodiment where the processor 30 comprises a multi-threaded microprocessor capable of processing two threads, the next instruction pointer 100 may include a multiplexer (MUX) (not shown) that selects between instruction pointers associated with either the first or second thread for inclusion within the next instruction request issued therefrom. In one embodiment, the next instruction pointer 100 will interleave next instruction requests for the first and second threads on a cycle-by-cycle ("ping pong") basis, assuming instructions for both threads have been requested, and instruction streaming buffer 106 resources for both of the threads have not been exhausted. The next instruction pointer requests may be for either 16, 32 or 64-bytes depending on whether the initial request address is in the upper half of a 32-byte or 64-byte aligned line. The next instruction pointer 100 may be redirected by the branch predictor 104, the branch address calculator 114 or by the trace cache 62, with a trace cache miss request being the highest priority redirection request.

When the next instruction pointer 100 makes an instruction request to the unified cache 44, it generates a two-bit "request identifier" that is associated with the instruction request and functions as a "tag" for the relevant instruction request. When returning data responsive to an instruction request, the unified cache 44 returns the following tags or identifiers together with the data:

1. The "request identifier" supplied by the next instruction pointer 100;

2. A three-bit "chunk identifier" that identifies the chunk returned; and
3. A "thread identifier" that identifies the thread to which the returned data belongs.

Next instruction requests are propagated from the next instruction pointer 100 to the instruction TLB 102, which performs an address lookup operation, and delivers a physical address to the unified cache 44. The unified cache 44 delivers a corresponding macroinstruction to the instruction streaming buffer 106. Each next instruction request is also propagated directly from the next instruction pointer 100 to the instruction streaming buffer 106 so as to allow the instruction streaming buffer 106 to identify the thread to which a macroinstruction received from the unified cache 44 belongs. The macroinstructions from both first and second threads are then issued from the instruction streaming buffer 106 to the instruction pre-decoder 108, which performs a number of length calculation and byte marking operations with respect to a received instruction stream (of macroinstructions). Specifically, the instruction pre-decoder 108 generates a series of byte marking vectors that serve, inter alia, to demarcate macroinstructions within the instruction stream propagated to the instruction steering logic 110.

The instruction steering logic 110 then utilizes the byte marking vectors to steer discrete macroinstructions to the instruction decoder 112 for the purposes of decoding. Macroinstructions are also propagated from the instruction steering logic 110 to the branch address calculator 114 for the purposes of branch address calculation. Microinstructions are then delivered from the instruction decoder 112 to the trace delivery engine 60.

During decoding, flow markers are associated with each microinstruction. A flow marker indicates a characteristic of the associated microinstruction and may, for example, indicate the associated microinstruction as being the first or last microinstruction in a microcode sequence representing a macroinstruction. The flow markers include a "beginning of macroinstruction" (BOM) and an "end of macroinstruction" (EOM) flow markers. According to the present invention, the decoder 112 may further decode the microinstructions to have shared resource (multiprocessor) (SHRMP) flow markers and synchronization (SYNC) flow markers associated therewith. Specifically, a shared resource flow marker identifies a microinstruction as a location within a particular thread at which the thread may be interrupted (e.g., re-started or paused) with less negative consequences than elsewhere in the thread. The decoder 112, in an exemplary embodiment of the present invention, is constructed to mark microinstructions that comprise the end or the beginning of a parent macroinstruction with a shared resource flow marker. A synchronization flow market identifies a microinstruction as a location within a particular thread at which the thread may be synchronized with another thread responsive to, for example, a synchronization instruction within the other thread.

From the microinstruction translation engine 54, decoded instructions (i.e., microinstructions) are sent to a trace delivery engine 60. The trace delivery engine 60 includes the trace cache 62, a trace branch predictor (BTB) 64, a microcode sequencer 66 and a microcode (uop) queue 68. The trace delivery engine 60 functions as a microinstruction cache, and is the primary source of microinstructions for a downstream execution unit 70. By providing a microinstruction caching function within the processor pipeline, the trace delivery engine 60, and specifically the trace cache 62, allows translation work done by the microinstruction translation engine 54 to be leveraged to provide an increased microinstruction bandwidth. In one exemplary embodiment, the trace cache 62 may comprise a 256 set, 8 way set associate memory. The term "trace", in the present exemplary embodiment, may refer to a sequence of microinstructions stored within entries of the trace cache 62, each entry including pointers to preceding and proceeding microinstructions comprising the trace. In this way, the trace cache 62 facilitates high-performance sequencing in that the address of the next entry to be accessed for the purposes of obtaining a subsequent microinstruction is known before a current access is complete. Traces may be viewed as "blocks" of instructions that are distinguished from one another by trace heads, and are terminated upon encountering an indirect branch or by reaching one of many present threshold conditions, such as the number of conditioned branches that may be accommodated in a single trace or the maximum number of total microinstructions that may comprise a trace. The trace cache branch prediction unit 64 provides local branch predictions pertaining to traces within the trace cache 62. The trace cache 62 and the microcode sequencer 66 provide microinstructions to the microcode queue 68, from where the microinstructions are then fed to an out-of-order execution cluster. The microcode sequencer 66 furthermore includes a number of event handlers embodied in microcode, that implement a number of operations within the processor 30 in response to the occurrence of an event such as an exception or an interrupt. The event handlers 67 are invoked by an event detector (not shown) included within a register renamer 74 in the back end of the processor 30.

The processor 30 may be viewed as having an in-order front-end, comprising the bus interface unit 32, the memory execution unit 42, the microinstruction translation engine 54 and the trace delivery engine 60, and an out-of-order back-end that will be described in detail below.

Microinstructions dispatched from the microcode queue 68 are received into an out-of-order cluster 71 comprising a scheduler 72, the register renamer 74, an allocator 76, a reorder buffer 78 and a replay queue 80. The scheduler 72 includes a set of reservation stations, and operates to schedule and dispatch microinstructions for execution by the execution unit 70. The register renamer 74 performs a register renaming function with respect to hidden integer and floating point registers (that may be utilized in place of any of the eight general purpose registers or any of the eight floating-point registers, where a processor 30 executes the Intel Architecture instruction set). The allocator 76 operates to allocate resources of the execution unit 70 and the cluster 71 to microinstructions according to availability and need. In the event that insufficient resources are available to process a microinstruction, the allocator 76 is responsible for asserting a stall signal 82, that is propagated through the trace delivery engine 60 to the microinstruction translation engine 54, as shown at 58. Microinstructions, which have had their source fields adjusted by the register renamer 74, are placed in a reorder buffer 78 in strict program order. When microinstructions within the reorder buffer 78 have completed execution and are ready for retirement, they are then removed from the reorder buffer 162. The replay queue 80 propagates microinstructions that are to be replayed to the execution unit 70.

The execution unit 70 is shown to include a floating-point execution engine 84, an integer execution engine 86, and a level 0 data cache 88. In one exemplary embodiment in which is the processor 30 executes the Intel Architecture instruction set, the floating point execution engine 84 may further execute MMX® instructions.

Multithreading Implementation

In the exemplary embodiment of the processor 30 illustrated in FIG. 2, there may be limited duplication or replication of resources to support a multithreading capability, and it is accordingly necessary to implement some degree of resource sharing between threads. The resource sharing scheme employed, it will be appreciated, is dependent upon the number of threads that the processor is able simultaneously to process. As functional units within a processor typically provide some buffering (or storage) functionality and propagation functionality, the issue of resource sharing may be viewed as comprising (1) storage and (2) processing/propagating bandwidth sharing components. For example, in a processor that supports the simultaneous processing of two threads, buffer resources within various functional units may be statically or logically partitioned between two threads. Similarly, the bandwidth provided by a path for the propagation of information between two functional units must be divided and allocated between the two threads. As these resource sharing issues may arise at a number of locations within a processor pipeline, different resource sharing schemes may be employed at these various locations in accordance with the dictates and characteristics of the specific location. It will be appreciated that different resource sharing schemes may be suited to different locations in view of varying functionalities and operating characteristics.

Figure 3:
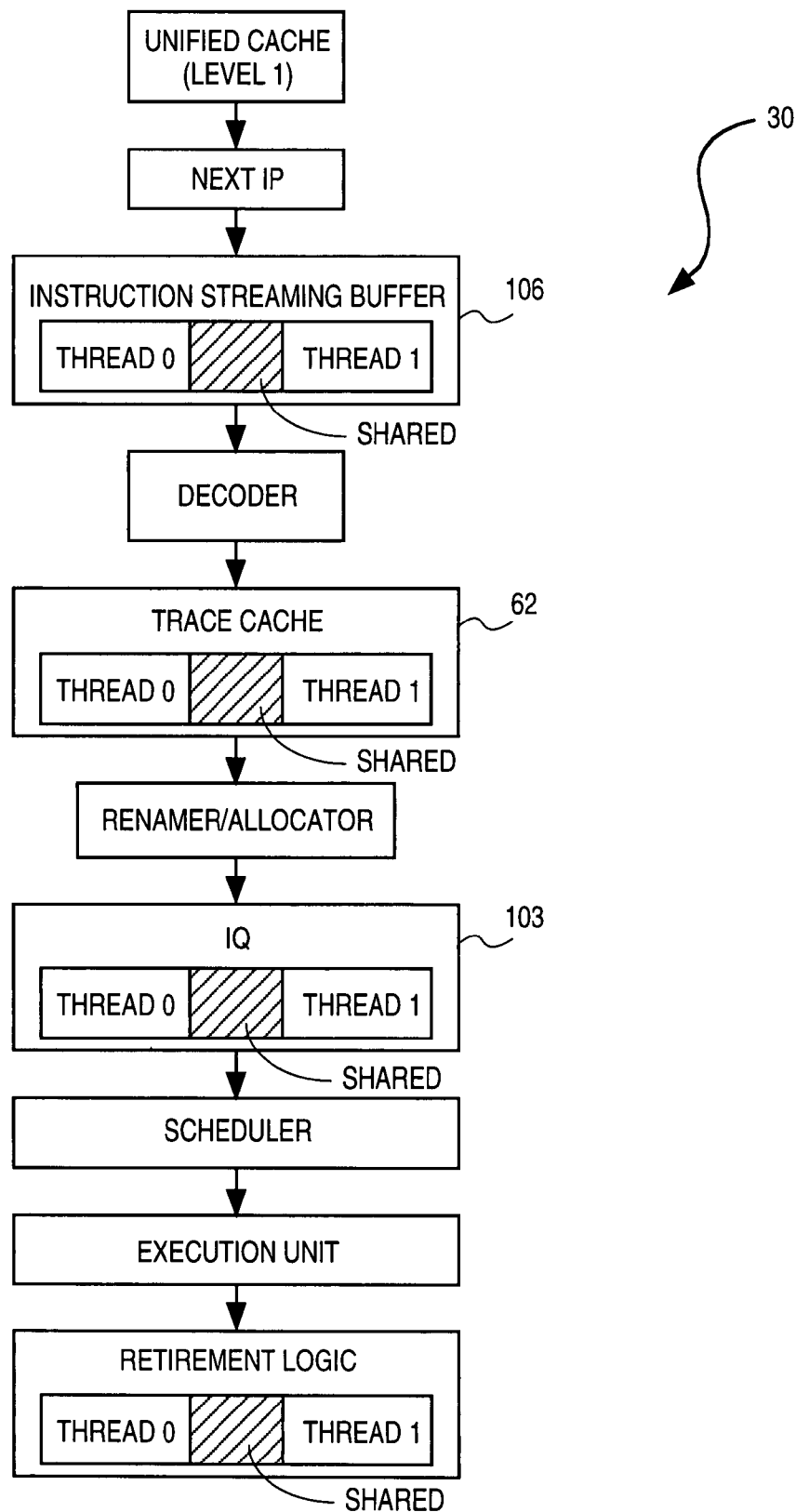
FIG. 3 is a block diagram illustrating selected components of an exemplary multi-threaded microprocessor, and specifically depicts various functional units that provide a buffering (or storage) capability as being logically partitioned to accommodate multiple thread.

FIG. 3 is a block diagram illustrating selected components of the processor 30 illustrated in FIG. 2, and depicts various functional units that provide a buffering capability as being logically partitioned to accommodate two threads (i.e., thread 0 and thread 1). The logical partitioning for two threads of the buffering (or storage) and processing facilities of a functional unit may be achieved by allocating a first predetermined set of entries within a buffering resource to a first thread and allocating a second predetermined set of entries within the buffering resource to a second thread. Specifically, this may be achieved by providing two pairs of read and write pointers, a first pair of read and write pointers being associated with a first thread and a second pair of read and write pointers being associated with a second thread. The first set of read and write pointers may be limited to a first predetermined number of entries within a buffering resource, while the second set of read and write pointers may be limited to a second predetermined number of entries within the same buffering resource. In the exemplary embodiment, the instruction streaming buffer 106, the trace cache 62, and an instruction queue 103 are shown to each provide a storage capacity that is logically partitioned between the first and second threads. Each of these units is also shown to include a "shared" capacity that may, according to respective embodiments, be dynamically allocated to either the first or the second thread according to certain criteria.

Trace Delivery Engine

One embodiment of the present invention is described below as being implemented within a trace delivery engine 60, and specifically with respect to a trace cache 62. However, it will be appreciated that the present invention may be applied to a partition any resources within or associated with a processor, and the trace delivery engine 60 is merely provided as an exemplary embodiment.

As alluded to above, the trace delivery engine 60 may function as a primary source of microinstructions during periods of high performance by providing relatively low latency and high bandwidth. Specifically, for a CISC instruction set, such as the Intel Architecture x86 instruction set, decoding of macroinstructions to deliver microinstructions may introduce a performance bottleneck as the variable length of such instructions complicates parallel decoding operations. The trace delivery engine 60 attempts to address this problem to a certain extent by providing for the caching of microinstructions, thus obviating the need for microinstructions executed by the execution unit to be continually decoded.

To provide high-performance sequencing of cached microinstructions, the trace delivery engine 60 creates sequences of entries (or microinstructions) that may conveniently be labeled "traces". A trace may, in one embodiment, facilitate sequencing in that the address of a subsequent entry can be known during a current access operation, and before a current access operation is complete. In one embodiment, a trace of microinstructions may only be entered through a so-called "head" entry, that includes a linear address that determines a set of subsequent entries of the trace event stored in successive sets, with every entry (except a tail entry) containing a way pointer to a next entry. Similarly, every entry (except a head entry) contains a way pointer to a previous entry.

In one embodiment, the trace delivery engine 60 may implement two modes to either provide input thereto or output therefrom. The trace delivery engine 60 may implement a "build mode" when a miss occurs with respect to a trace cache 62, such a miss being passed on to the microinstruction translation engine 54. In the "build mode", the microinstruction translation engine 54 will then perform a translation operation on a macroinstruction received either from the unified cache 44, or by performing a memory access operation via the processor bus. The microinstruction translation engine 54 then provides the microinstructions, derived from the macroinstruction(s), to the trace delivery engine 60 which populates the trace cache 62 with these microinstructions.

When a trace cache hit occurs, the trace delivery engine 60 operates in a "stream mode" where a trace, or traces, of microinstructions are fed from the trace delivery engine 60, and specifically the trace cache 62, to the processor back end via the microinstruction queue 68.

Figure 4:
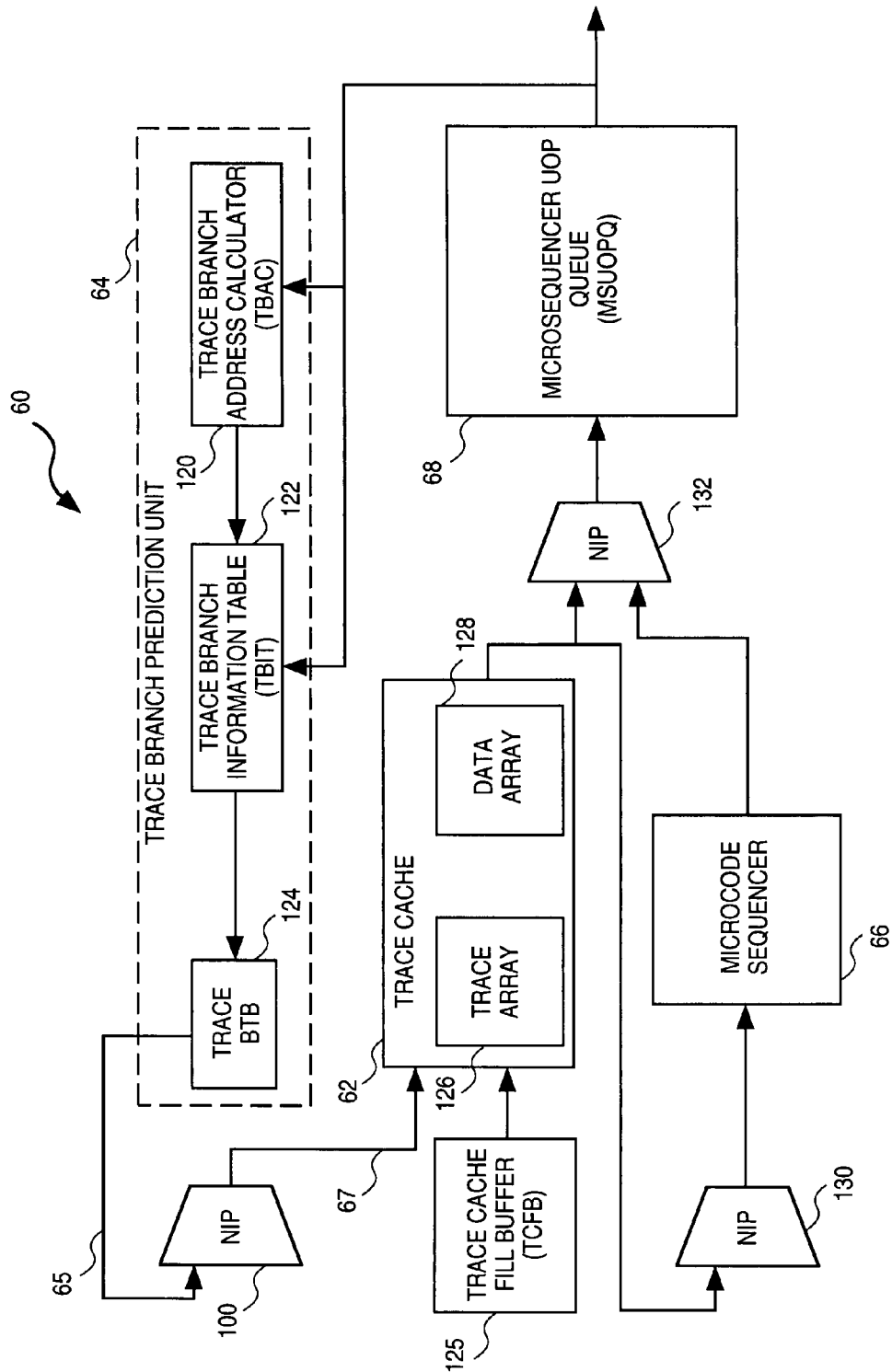
FIG. 4 is a block diagram showing further details regarding various components of an exemplary trace delivery engine (TDE).

FIG. 4 is a block diagram showing further details regarding the various components of the trace delivery engine (TDE) 60 shown in FIG. 2. The next instruction pointer 100, which forms part of the microinstruction translation engine 54, is shown to receive a prediction output 65 from the trace branch prediction unit 64. The next instruction pointer 100 provides an instruction pointer output 67, which may correspond to the prediction output 65, to the trace cache 62.

A trace branch address calculator (TBAC) 120 monitors the output of the microsequencer microinstruction queue 68, and performs a number of functions to provide output to a trace branch information table 122. Specifically, the trace branch address calculator 120 is responsible for bogus branch detection, the validation of branch target and branch prediction operations, for computing a Next Linear Instruction Pointer (NILIP) for each instruction, and for detecting limit violations for each instruction.

The trace branch information table (TBIT) 122 stores information required to update the trace branch prediction unit 64. The table 122 also holds information for events and, in one embodiment, is hard partitioned to support multithreading. Of course, in an alternative embodiment, the table 122 may be dynamically partitioned.

The trace branch information table 122 provides input to a trace branch target buffer (trace BTB) 124 that operates to predict "leave trace" conditions and "end-of-trace" branches. To this end, the buffer 124 may operate to invalidate microinstructions.

When operating in the above-mentioned "build mode", microinstructions are received into the trace cache 62 via a trace cache fill buffer (TCFB) 125, which is shown in FIG. 4 to provide input into the trace cache 62.

Figure 5:
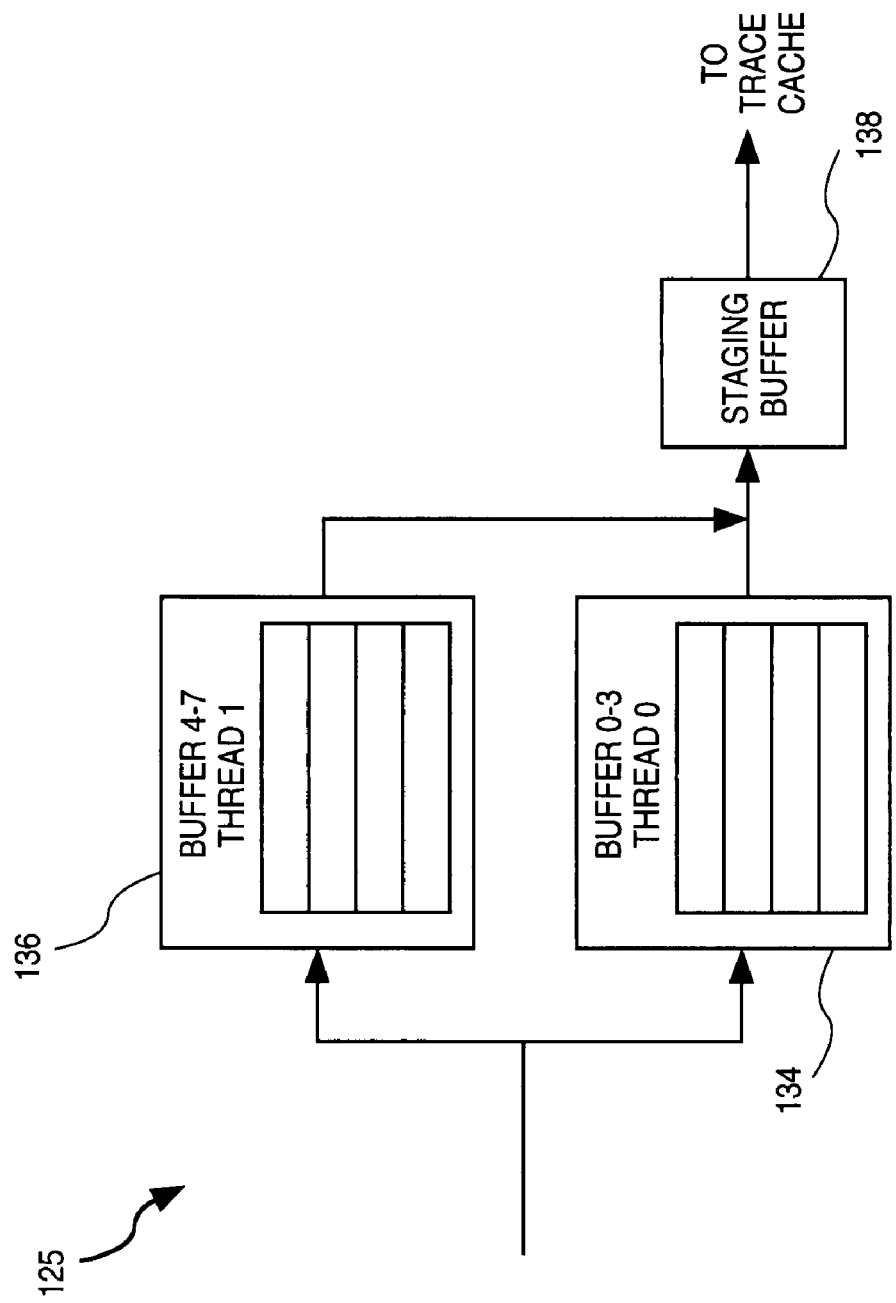
FIG. 5 is a block diagram illustrating further architectural details of an exemplary trace cache fill buffer.

FIG. 5 is a block diagram illustrating further architectural details of the trace cache fill buffer 125. In one embodiment of the buffer 125 includes first and second buffers 134 and 136, each of which is dedicated to a specific thread (e.g., thread 0 and thread 1). Each of the buffers 134 and 136 provides four (4) entries for an associated thread, and outputs microinstructions to a staging buffer 138, from where the microinstructions are communicated to the trace cache 62. The trace cache fill buffer 125 implements a build algorithm in hardware that realizes the "build mode", and provides microinstruction positioning, and the detection of "end-of-line" and "end-of-trace" conditions.

The trace cache 62 is shown in FIG. 4 to include a data array 128 and an associated tag array 126. The data array 128 provides a storage for, in one embodiment, 12 KB of microinstructions.

Figure 6:
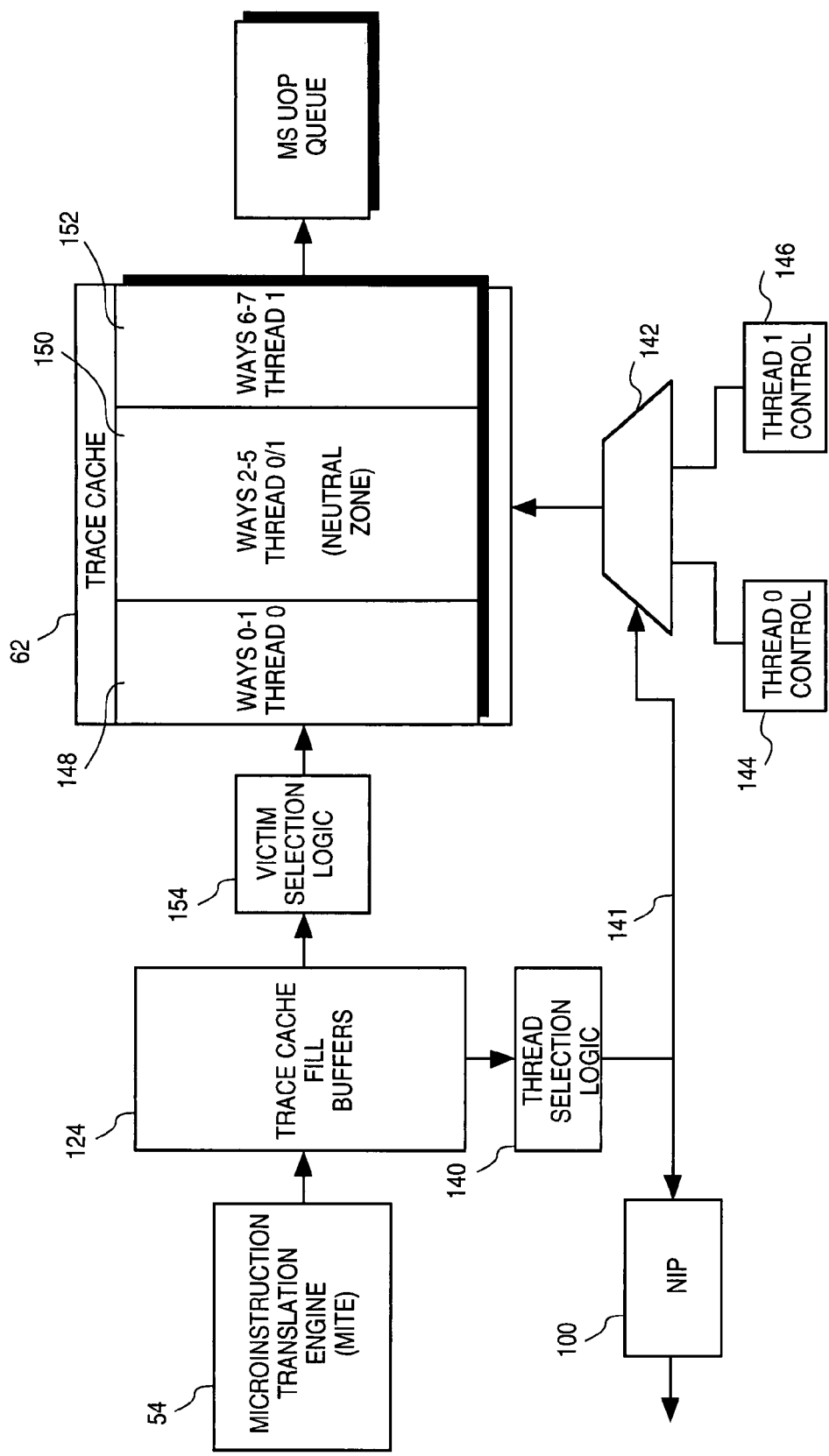
FIG. 6 is a block diagram illustrating further architectural details of an exemplary trace cache (TC).

FIG. 6 is a block diagram illustrating further architectural details pertinent to the trace cache 62. The thread selection logic 140 implements a thread selection state machine that, in one embodiment, decides on a cycle-by-cycle basis which of multiple threads (e.g., thread 0 or thread 1) is propagated to subsequent pipe stages of a processor 30.

FIG. 6 also illustrates the partitioning of the trace cache 62 into three portions (or sections), namely a first portion 148 dedicated to a first thread, a second portion 152 dedicated to a second thread, and a third portion 150 that is dynamically shared between the first and second threads. In the exemplary embodiment, each of the first and second portions 148 and 152 comprises two (2) ways of the data array 128 (and the associated tag array 126) of the trace cache 62. The third, shared portion 150 constitutes four (4) of the data array 128, and the associated tag array 126. The illustrated partitioning of the trace cache 62 is implemented by victim selection logic 154, which will be described in further detail below.

Figure 7:
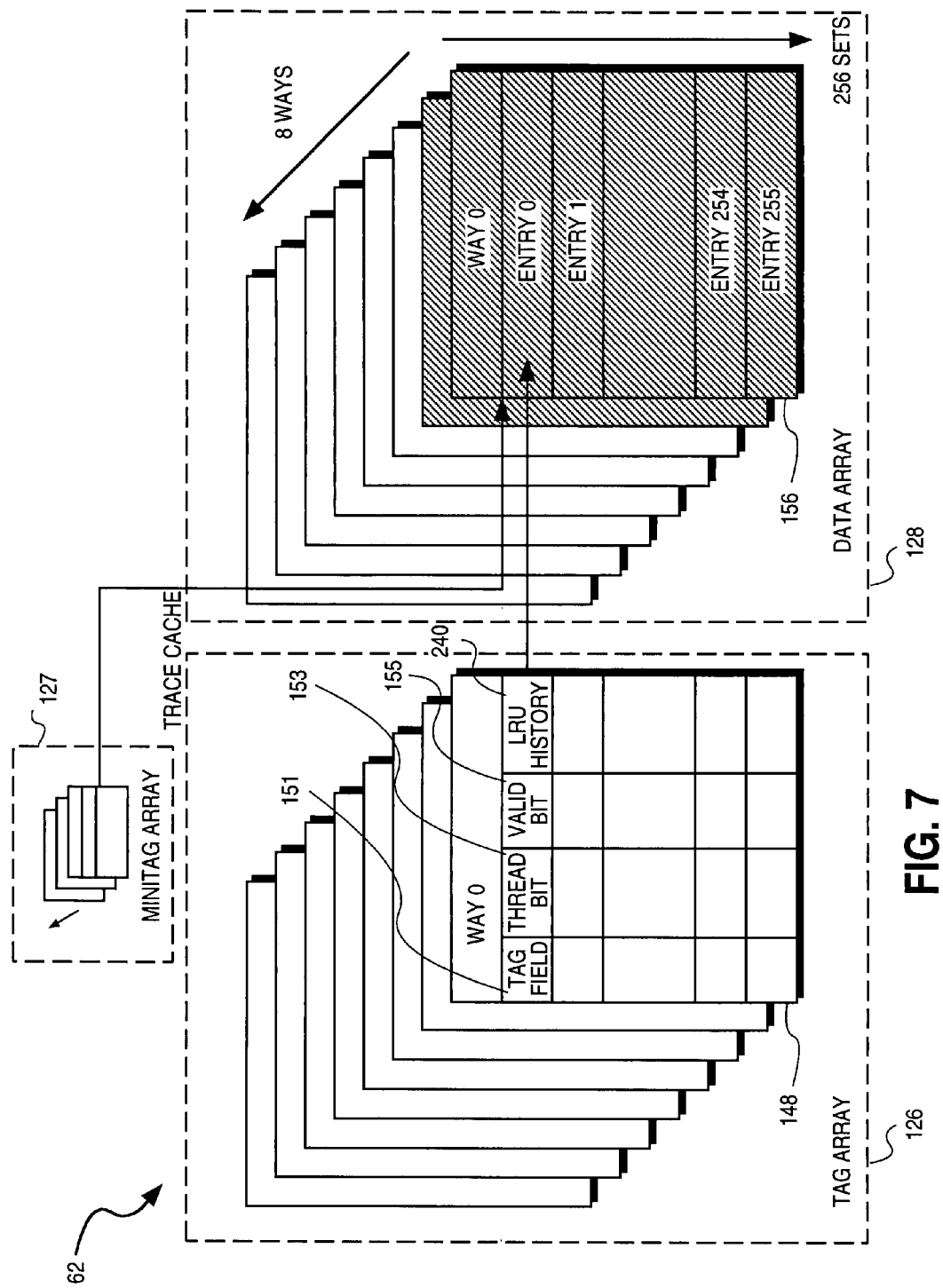
FIG. 7 is a block diagram illustrating further structural details of an exemplary trace cache (TC)

FIG. 7 is a block diagram illustrating an exemplary structure of the trace cache 62, according to one embodiment. Each of the tag array 126 and the data array 128 are each shown to comprise an eight-way, set associative arrangement, including 256 sets thus providing a total of 2048 entries within each of the tag and data arrays 126 and 128. Each entry 148 within the tag array 126 is show to store, inter alia, tag field information 151, a thread bit 153, a valid bit 155 and a Least Recently Used (LRU) bit 240 for each corresponding entry 156 within the data 128. The thread bit 153 marks the data within the associated entry 156 as belonging, for example, to either a first or a second thread. The valid bit 155 marks the data within the corresponding entry 156 of the data array 128 as being valid or invalid.

One embodiment of the trace cache 62 may also include a further minitag array 127, as illustrated in FIG. 7, that is a subset of the full tag array 126 and that is utilized to perform high-speed tag match operations and for reducing power consumption related to performing a lookup with respect to the trace cache 62. A hit on the minitag array 127 may be regarded as "mutually exclusive", as will be described in further detail below.

Thread Selection Logic

Figure 8:
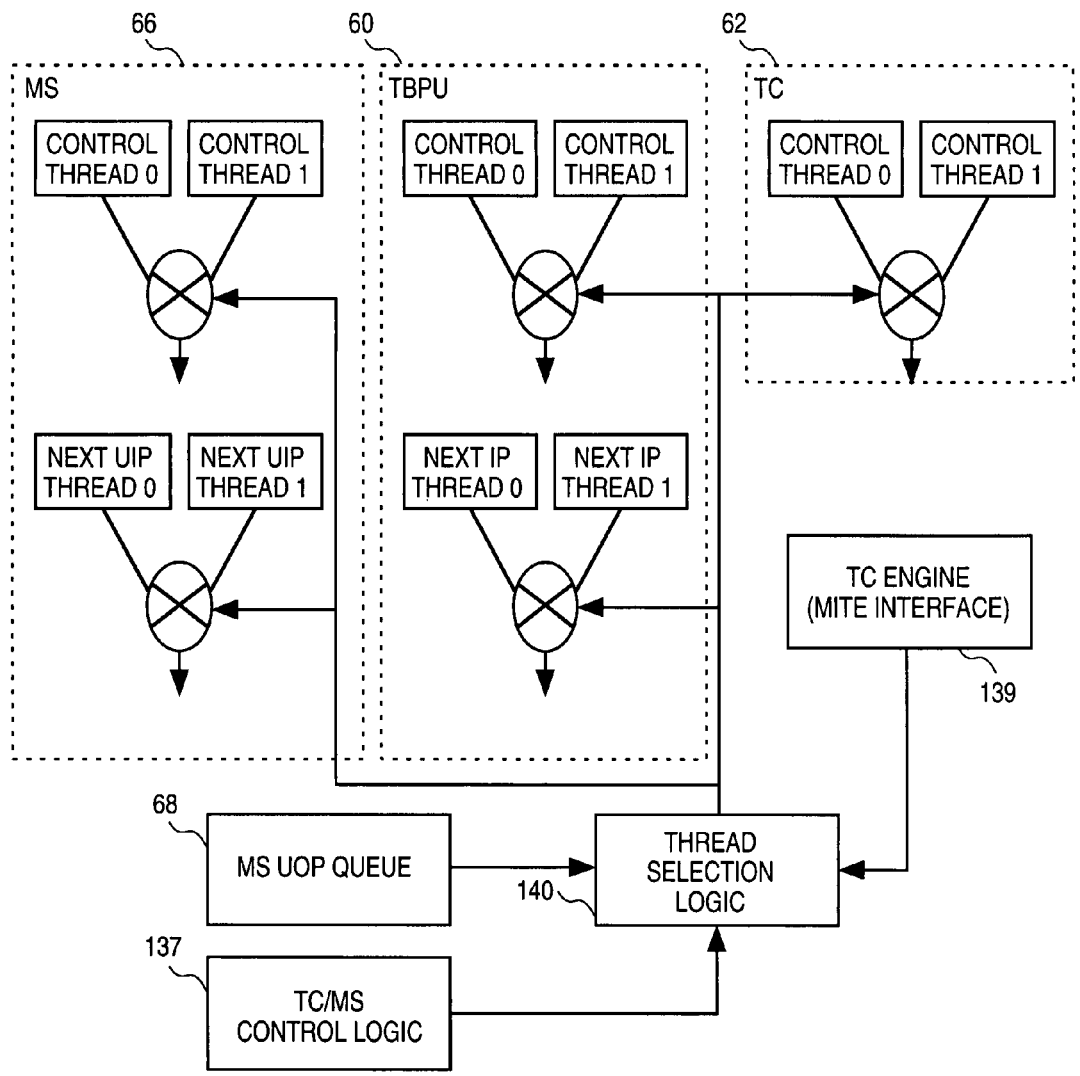
FIG. 8 is a block diagram illustrating various inputs and outputs of exemplary thread selection logic.

Dealing first with the thread selection logic 140, which determines, inter alia, the output of the trace cache 62, FIG. 8 is a block diagram illustrating the various inputs and outputs of the thread selection logic 140. The thread selection logic 140 is shown to take inputs from (1) a trace cache build engine 139, located in the microinstruction translation engine interface, (2) the microinstruction queue 68 and (3) trace cache/microsequencer control logic 137. Utilizing these inputs, the thread selection logic 140 attempts to generate an advantageous thread selection (e.g., thread 0 or thread 1) for a particular cycle. Thread selection, in one embodiment, is performed on a cycle-by-cycle basis and attempts to optimize performance while not starving either thread of processor resources.

The output of the thread selection logic 140 is shown to be communicated to the microcode sequencer 66, the trace branch prediction unit 60 and the trace cache 62 to affect thread selection within each of these units.

Figure 9:
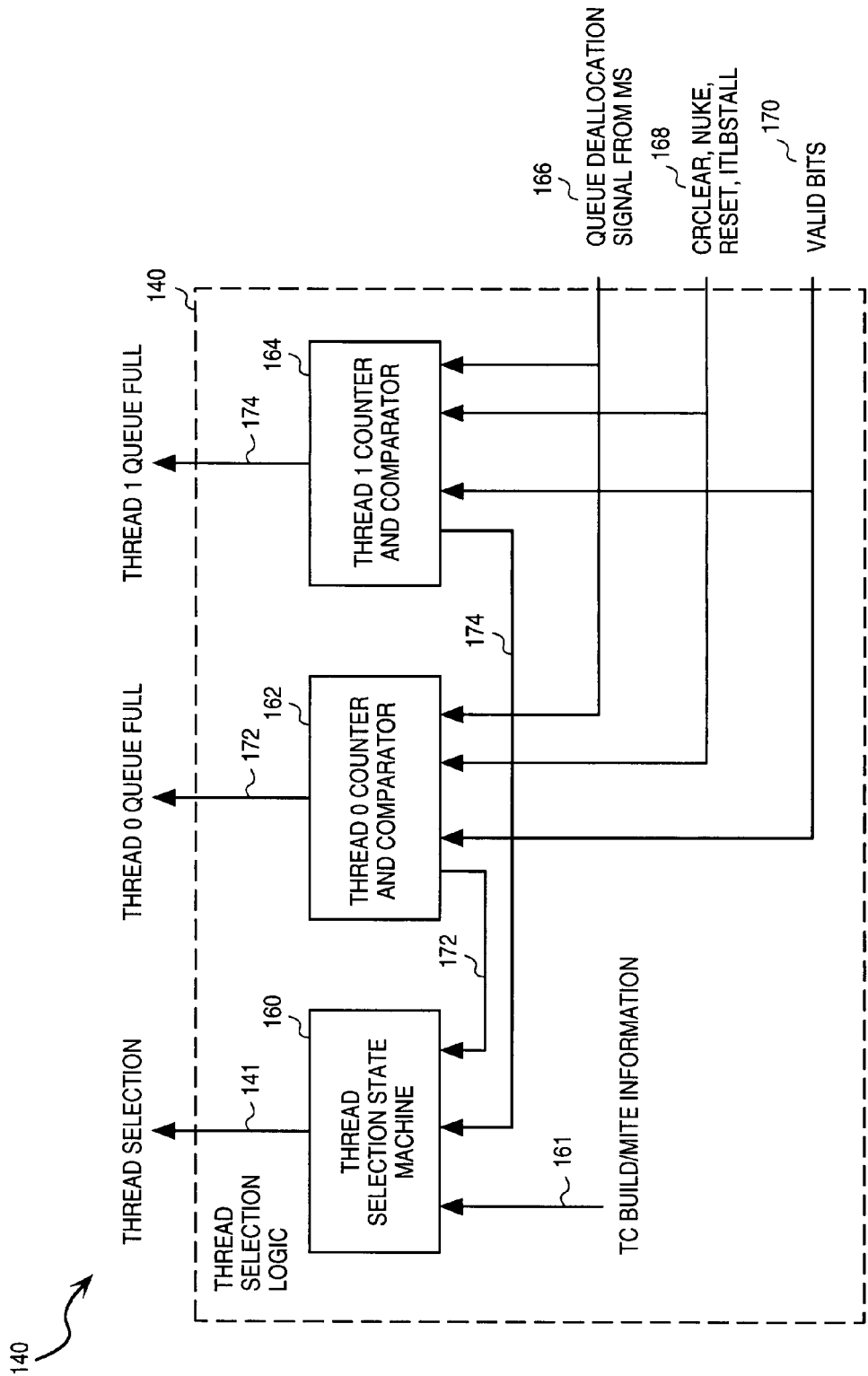
FIG. 9 is a block diagram illustrating three exemplary components of exemplary thread selection logic in the form of a thread selection state machine, and a counter and comparator for a second thread.

FIG. 9 is a block diagram illustrating three components of the thread selection logic 140, namely a thread selection state machine 160, a counter and comparator 162 for a first thread (e.g., thread 0) and a further counter and comparator 164 for a second thread (e.g., thread 1).

The thread selection state machine 160 is shown to receive build and mode signals 161, indicating whether the processor is operating in a multithreaded (MT) or a single threaded (ST) mode and if operating in a multithreaded mode, indicating whether or not each thread is in a build mode. The thread selection state machine 160 is also shown to receive respective full inputs 172 and 174 from the counter and comparator units 162 and 164. The full signals 172 and 174 indicate whether a threshold number of microinstructions for a particular thread are within the trace delivery engine 160. In one embodiment, each of the units 162 and 164 allow a total 4×6 microinstruction lines within the trace delivery engine 60. The full signals 172 and 174 are routed to all the units within the trace delivery engine 160, responsive to which such units are responsible for recycling their states. Each of the counter comparator units 162 and 164 is shown to receive a queue deallocation signal 166 from the microcode sequencer 66, a collection of clear, nuke, reset and store signals 168 and valid bits 170 from the trace cache tag array 126.

Figure 10:
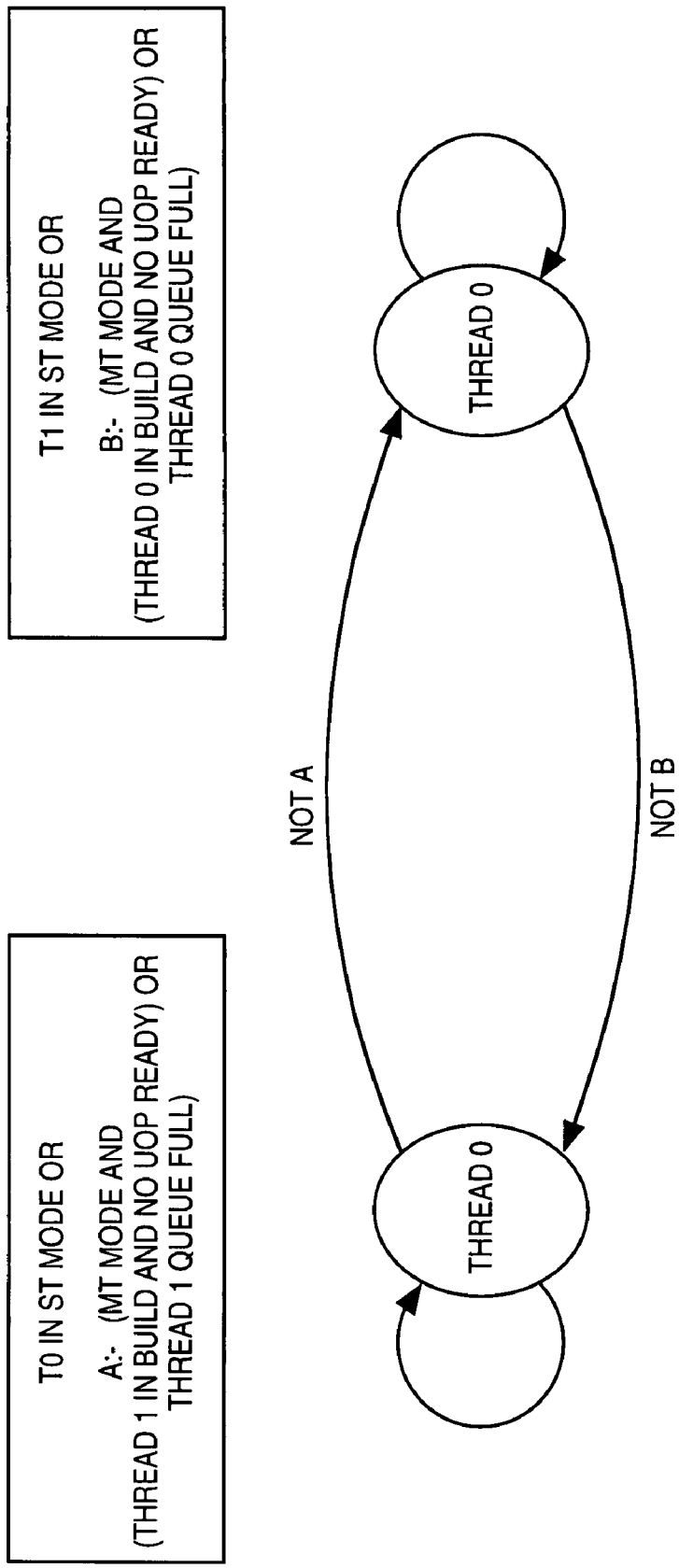
FIG. 10 is a state diagram illustrating exemplary operation of an exemplary thread selection state machine.

FIG. 10 is a state diagram illustrating operation of the thread selection state machine 160, illustrated in FIG. 9. When in multithreading mode, the state machine attempts to time-multiplex multiple threads on a cycle-by-cycle basis. When a thread encounters a relatively long stall, the state machine 160 attempts to provide full bandwidth to the thread that has not stalled. When multiple threads (e.g., thread 0 and thread 1) experience long latency stalls, the state machine 160 may, in certain circumstances, require a one-cycle bubble (e.g., if both threads are stalled and the state machine 160 is in "thread 0" state and a "thread 1" stall is removed).

Referring back to FIG. 6, it will be noted that the selection signal 141, outputted from the thread selection logic 140, is not itself regarded as a "valid bit", but is rather used as a 2-1 MUX selection control to the MUX 142. The MUX 142 operates to select between control signals outputted from a first thread control 144 and a second thread control 146. The outputs of the controls 144 and 146 are dependent upon valid bits being set for the relevant threads. For example, the selection signal 141 may indicate a thread entry for a particular thread (e.g., thread 0) to be outputted from the trace cache 62. However, the valid bit for the relevant entry may be set to 0, indicating an invalid entry.

Victim Selection Logic

The partitioning of the trace cache 62, as illustrated in FIG. 6, may, in one embodiment, be implemented by the victim selection logic 154. The victim selection logic 154 is responsible for identifying the way (in both the tag array 126 and the data array 128) to which a microinstruction is written.

Figure 11:
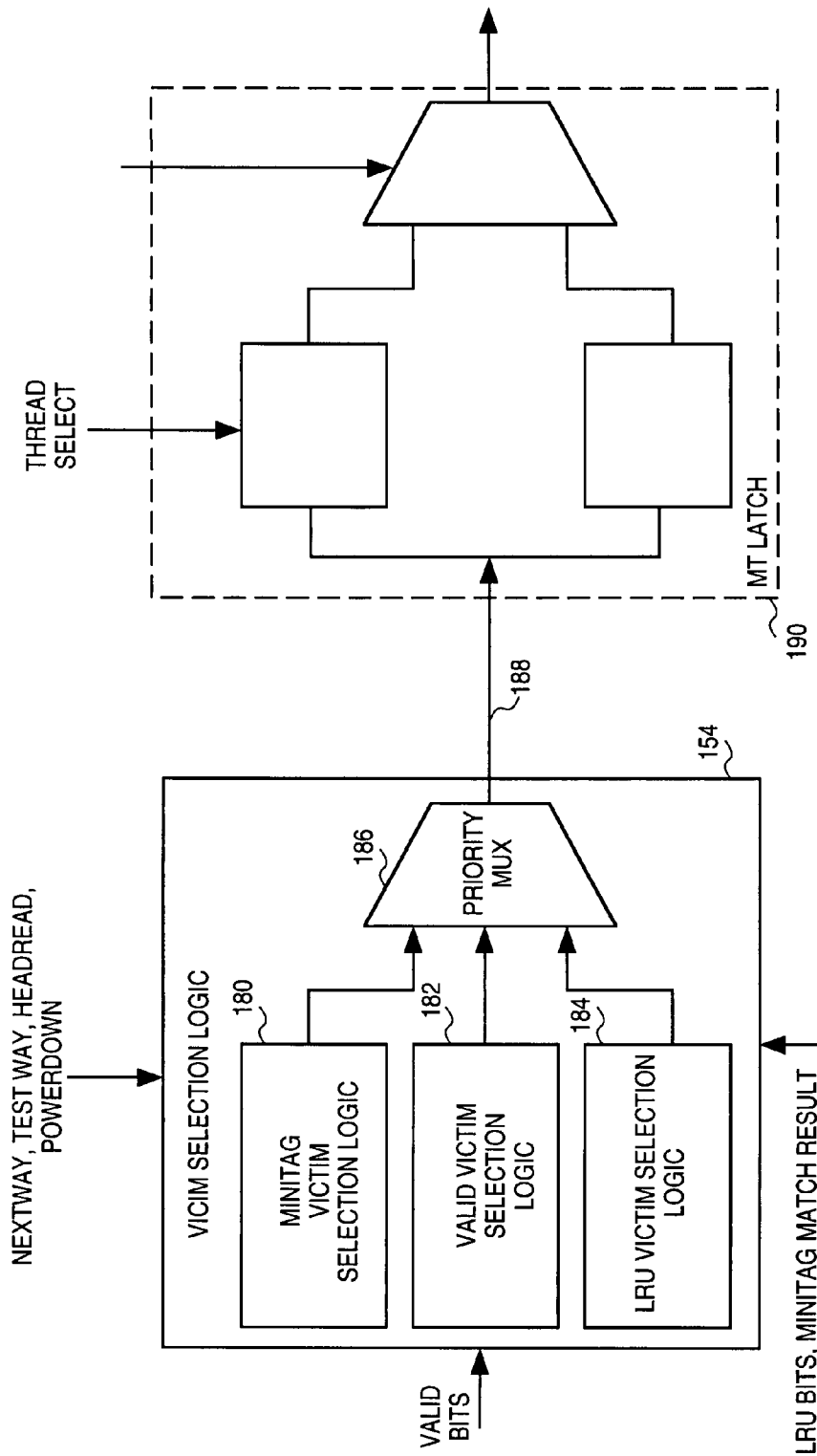
FIG. 11 is a block diagram illustrating architectural details of an exemplary embodiment of victim selection logic.

FIG. 11 is a block diagram illustrating architectural details of one embodiment of the victim selection logic 154. The victim selection logic 154 is shown to include minitag victim selection logic 180, valid victim selection logic 182 and Least Recently Used (LRU) victim selection logic 184. A priority multiplexing operation is performed on the outputs of the selection logics 180, 182 and 184 by a priority MUX 186. The priority ordering implemented by the priority MUX 186 is as follows:

1. Minitag victim;
2. Valid victim; and
3. LRU victim.

A multi-threaded latch structure 190 is used to pass the results of the priority MUX to the trace cache 62.

Figure 12:
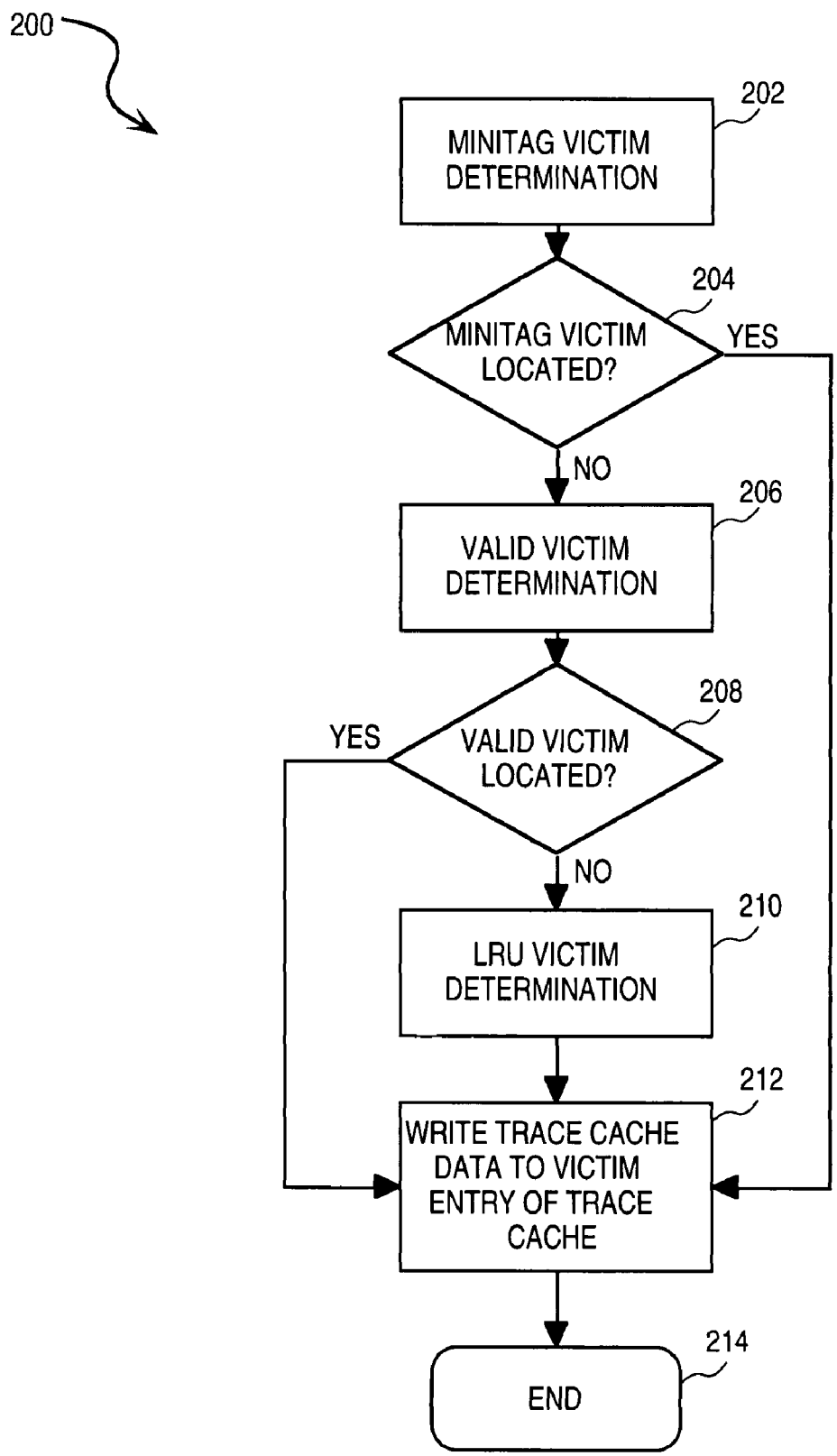
FIG. 12 is a flow chart illustrating an exemplary method of partitioning a memory resource, such as for example a trace cache, within a multi-threaded processor.

FIG. 12 is a flow chart illustrating an exemplary method 200, according to one embodiment, of partitioning a memory resource, such as for example, the trace cache, within a multi-threaded processor. The operation of the various units of the victim selection logic 154 illustrated in FIG. 11 will be described with reference to the flow chart shown in FIG. 12.

The method 200 commences at block 202 where the minitag victim selection logic 180 performs a minitag victim determination with respect to the minitag array 127. Specifically, the logic 180 attempts to identify a conflict between an existing valid minitag array entry and a current instruction pointer (e.g., the current Linear Instruction Pointer (CLIP)).

At decision box 204, a determination is made as to whether a minitag victim was located at block 202. If so, the method 200 advances to block 212, where relevant trace cache data (e.g., a microinstruction) is written to the identified victim entry within the trace cache 62. As a minitag hit is regarded as being "mutually exclusive", an identified minitag victim is given the highest priority by the victim selection logic 154.

Following a negative determination at decision box 204, at block 206, a valid victim determination operation is performed by the valid victim selection logic 182. This operation involves simply identifying an invalid entry within the trace cache 62 by examining valid bits 155 stored within the tag array 126 of the trace cache 62. Following a positive determination at decision box 208, the method 200 advances to block 212. On the other hand, following a negative determination (i.e., no invalid entries are identified) at decision box 208, the method 200 proceeds to box 210, where a LRU victim determination operation is performed. Following completion of the operation at block 210, the method 200 again advances to block 212. The method 200 then terminates at step 214.

Figure 13:
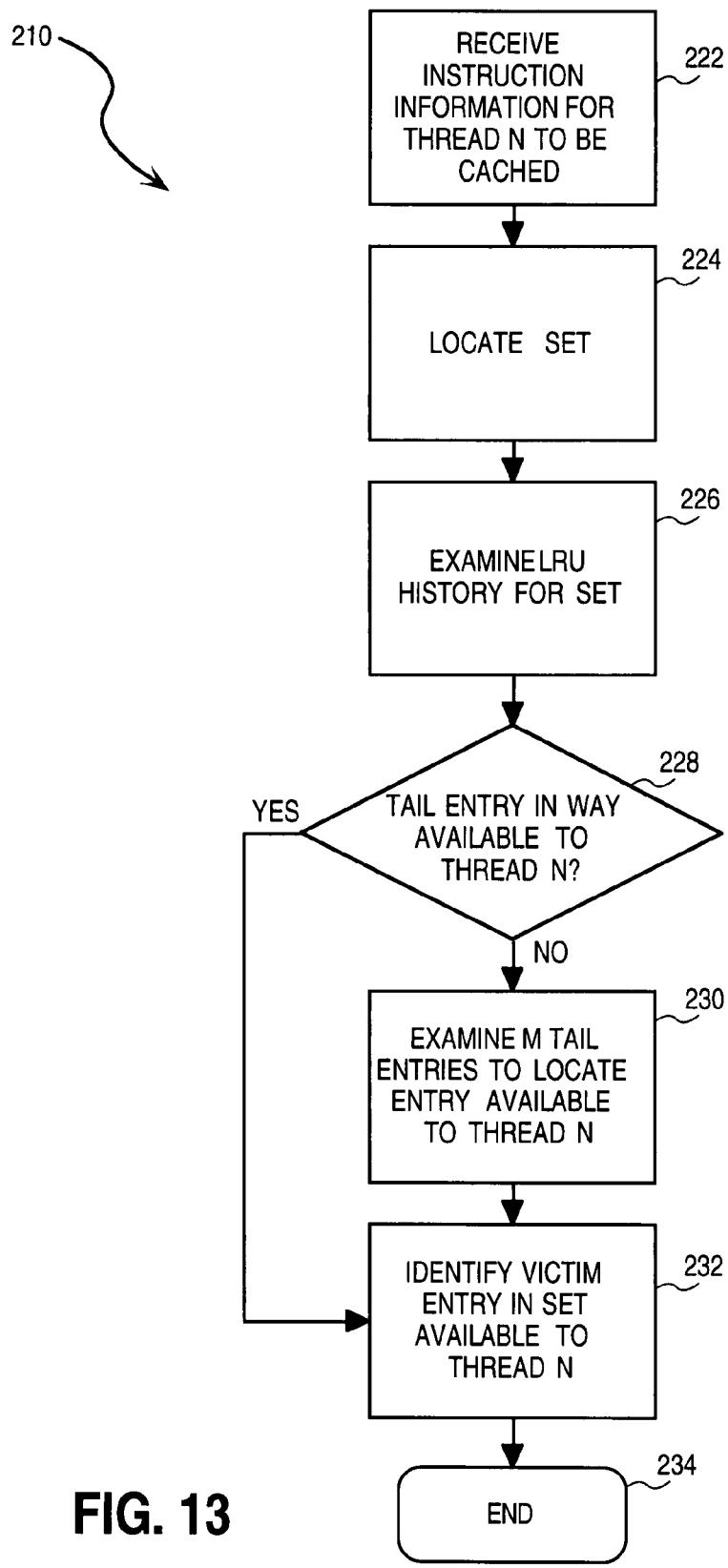
FIG. 13 is a flow chart illustrating an exemplary method of partitioning a resource, in the exemplary form of a memory resource, utilizing a Least Recently Used (LRU) history associated with the relevant memory resource.

FIG. 13 is a flow chart illustrating an exemplary method 210, according to one embodiment, of partitioning a resource, in the exemplary form of a memory resource, utilizing a LRU history associated with the relevant memory resource.

Figure 14:
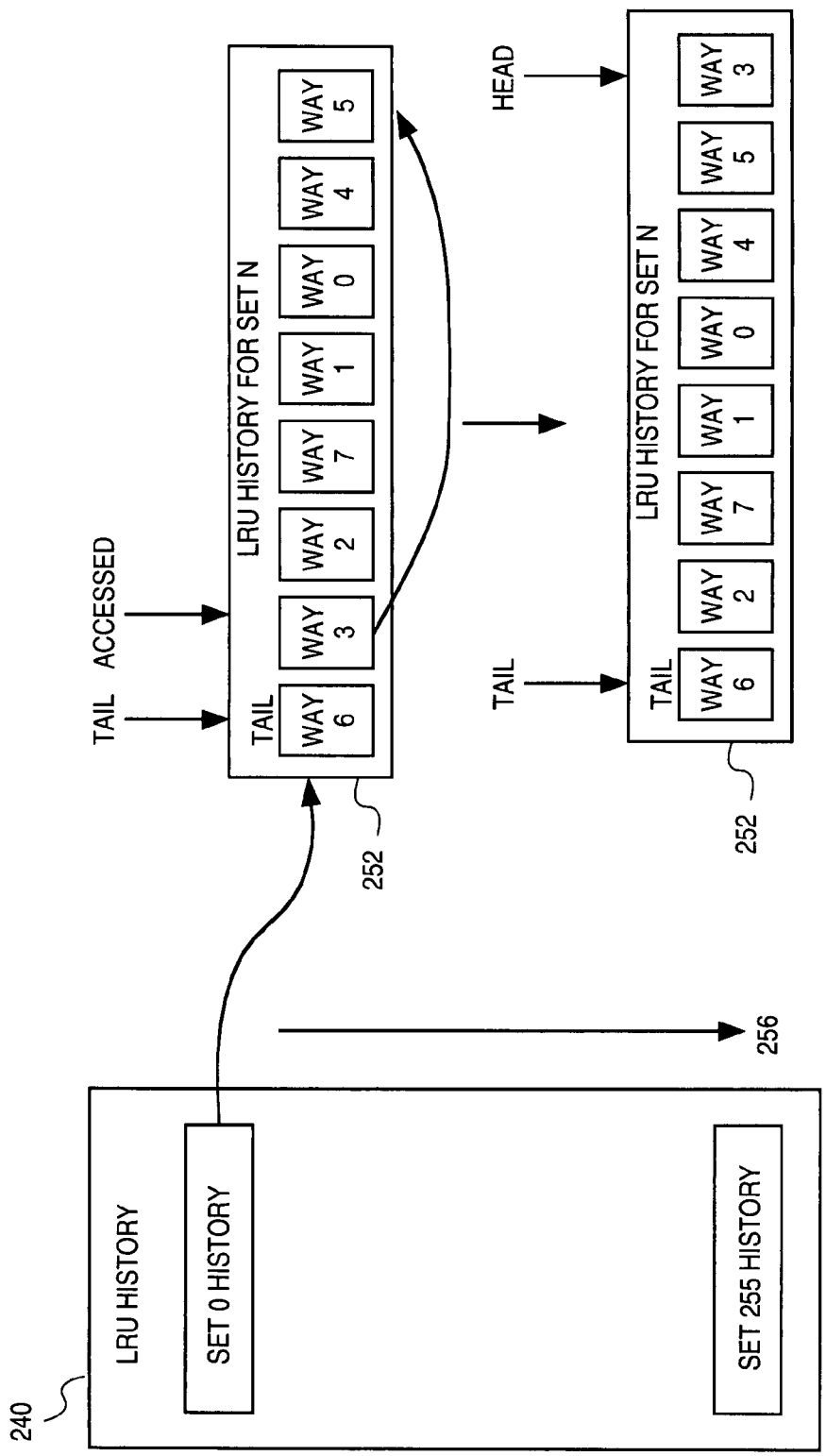
FIG. 14 is a block diagram illustrating an exemplary LRU history data structure.

FIG. 14 is a block diagram illustrating an exemplary LRU history 240 that may be utilized in the performance of the method 210, the execution of which will be described with reference to FIG. 10.

The method 210 commences at block 222 with the receipt of a microinstruction, and associated tag information, at the victim selection logic 154.

At block 224, a set into which the microinstruction may potentially be written is identified (e.g., by a write pointer).

At block 226, having identified a victim set, the LRU victim selection logic 184 examines the LRU history for the relevant set. FIG. 14 illustrates the LRU history 240, as maintained within the tag array 126 of the trace cache 184, the LRU history 240 containing a LRU history for each set within the data array 128.

At decision box 228, the LRU victim selection logic 184 determines whether the tail entry, indicating a specific way within the set, is available to a relevant thread (e.g., thread 0 or thread 1). As mentioned above, in an exemplary embodiment, ways 0 and 1 may be available exclusively to a first thread (e.g., thread 0), ways 6 and 7 may be available exclusively to a second thread (e.g., thread 1) and ways 2-5 may be dynamically shared multiple threads. Referencing the exemplary LRU history for a set N, way 6 is indicated by the tail entry as being the least recently used way in the relevant set N. Assume, for example, that the microinstruction to be cache belongs to a first thread (e.g., thread 0) in which way 6 would not be available to receive the microinstruction on account of way 6 having been dedicated exclusively to the storage of microinstructions for a second thread (e.g., thread 1).

Returning to FIG. 13, following a negative determination at decisions box 228, the LRU victim selection logic 184 proceeds to examine entries within the LRU history 252 for the relevant set behind the tail entry to identify a way that may receive the microinstruction for the relevant thread. As indicated at block 230, the LRU victim selection logic 184 examines a predetermined set M of tail entries (e.g., the three entries closest to the tail of the LRU history 252 for the set) to locate a way, closest to the tail of the LRU history, that is available to the relevant thread.

In the example provided in FIG. 14, the next-to-last entry within the LRU history for the relevant set identifies way 3 which, under the scheme described above, would be available to receive a microinstruction for a first thread (e.g., thread 0) as way 3 is located in the "shared" portion of the trace cache 62.

FIG. 14 illustrates how the entry for way 3, within the LRU history 252 for the relevant set, is moved to the head of the LRU history 252 on account of this way being designated for storage of the relevant microinstruction.

Returning to the flow chart in FIG. 13, at block 232, the victim entry (i.e., the victim way) within the relevant set that is available to the relevant thread is identified, and the microinstruction written to that way within the set. The method 220 then ends at step 234.

Figure 15:
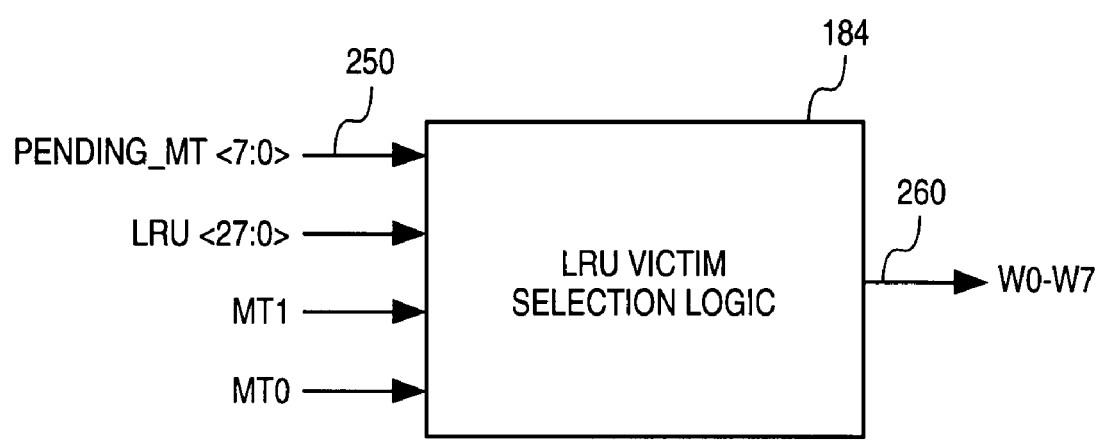
FIG. 15 is a block diagram illustrating further details pertaining to inputs to, and outputs from, exemplary victim selection logic.

FIG. 15 is a block diagram illustrating further details regarding the inputs to, and output from, the victim selection logic 184. The victim selection logic 184, in one embodiment, comprises discrete logic components that implement the methodology described above. In an alternative embodiment, the victim selection logic 184 may execute code to implement the described methodology. Specifically, the logic is shown to receive a 7-bit pending multi-thread (PENDING_MT) signal 250, a 28-bit least recently used (LRU) signal 252, a second thread status (NT1) signal 254 and a first thread status (MT0) signal 256 as inputs. The signal 250 indicates the way selected to receive a micro-instruction of a current thread or further thread (other than a thread currently being considered) by the selection logic 184 as indicated by the selection logic 184 during a previous victim selection operation, or as determined by further victim selection logic 154 associated with the further thread. The signal 250 is utilized by the LRU victim selection logic 184 to insure that the selection logic 184 does not "doubly select" the same way between two threads, or that multiple LRU victim selection logics 184 do not select the same way between two threads. To this end, the victim selection logic 184 implements discrete logic that prevents it from selecting the same way as indicated by the signal 250.

The signal 250 accordingly, in one embodiment, indicates the way that was previously selected as a victim, while the LRU signal 252 provides the LRU history 252 for the relevant set to the logic 184. The status signals 254 and 256 indicate to the logic 184 which of the threads are "alive" or executing within a processor 30. The logic 184 then outputs a 7-bit selection signal 260 for a relevant set, indicating the way within a relevant set to which the microinstruction should be written for caching purposes within the trace cache 62.

By implementing a pseudo-dynamic partitioning of a resource, such as the trace cache 62, the present invention ensures that a certain predetermined minimum threshold of the capacity of a resource is always reserved and available for a particular thread within a multithreaded processor. Nonetheless, by defining a "shared" portion that is accessible to both threads, the present invention facilitates dynamic redistribution of a resource's capacity between multiple threads according to the requirements of such threads.

Further, the LRU victim selection methodology discussed above enables hits to occur on ways allocated to a further thread, but simply disallows the validation of such a hit, and forces the LRU victim selection algorithm to select a further way, according to an LRU history, that is available to a particular thread.

As mentioned above, the logic for implementing any one of the methodologies discussed above may be implemented as discrete logic within a functional unit, or may comprise a sequence of instructions (e.g., code) that is executed within the processor to implement the method. The sequence of instructions, it will be appreciated, may be stored on any medium from which it is retrievable for execution. Examples of these mediums may be a removable storage medium (e.g., a diskette, CD-ROM) or a memory resource associated with, or included within, a processor (e.g., Random Access Memory (RAM), cache memories or the like). Accordingly, any such medium should be regarded as comprising a "computer-readable" medium and may be included in a processor, or accessible by a processor employed within a computer system.

Thus, a method and apparatus for partitioning a processor resource within a multi-threaded processor have been described. Although the present invention has been described with reference to specific exemplary embodiments, it will be evident that various modifications and changes may be made to these embodiments without departing from the broader spirit scope of the invention. Accordingly, the specification and drawings are to be regarded in an illustrative rather than a restrictive sense.

What is claimed:

1. A method including:
   dedicating a first portion comprising one or more ways of an N way set associative cache exclusively to a first thread;
   dedicating a second portion comprising one or more ways of the cache exclusively to a second thread;
   dynamically sharing a third portion comprising one or more ways of the cache between the first and second threads; and
   performing victim selection in the cache by,
   examining a Least Recently Used (LRU) history for a selected set to identify a least recently used way within the cache as a candidate way to store an information item associated with the first thread;
   determining whether the candidate way is within the first or the third portion of the cache;
   if the candidate way is within the first or the third portion of the cache, then storing the information associated with the first thread in the candidate way; and
   if the candidate way is within the second portion of the cache, then identifying a further way within the cache as being the candidate way, wherein the further way is not the candidate way previously identified.

2. The method of claim 1 wherein the dynamic sharing of the third portion of the cache is performed according to resource demands of the respective first and second threads.

3. The method of claim 1 wherein the examining includes examining the LRU history to identify M least recently used ways within the cache, wherein M>1, and wherein the determining is performed for the M candidate ways, and wherein the further way is another of the M candidate ways.

4. The method of claim 1 wherein the identifying of the further way as being the candidate way comprises identifying a second-least recently used way within the cache.

5. The method of claim 1 wherein the examining includes examining entries within the LRU history for the selected set, each entry corresponding to a respective one of the ways, wherein the entries are ordered in a sequence determined by least recent usage of the respective ways.

6. The method of claim 1 wherein the cache is a trace cache memory, and wherein the information item associated with the first thread comprises a microinstruction of the first thread.

7. An N way set associative cache comprising:
   a first portion comprising one or more ways dedicated to utilization by a first thread executing within a multi-threaded processor;
   a second portion comprising one or more ways dedicated to utilization by a second thread executing within the multi-threaded processor;
   a third portion comprising one or more ways shared by the first and second threads; and
   selection logic to examine a Least Recently Used (LRU) history for a selected set to identify a least recently used way within the cache as a candidate way within which to store an information item associated with the first thread, to store the information associated the first thread in the candidate way if the candidate way is within the first or third portions of the cache, but if the candidate way is within the second portion of the cache, then to identify a further way within the cache as being the candidate way, wherein the further way is not the candidate way previously identified.

8. The cache of claim 7 wherein the third portion of the cache is shared according to resource demands of the first and second threads.

9. The cache of claim 7 wherein the selection logic is to examine for the selected set the LRU history to identify M least recently used ways within the cache, and wherein M>1.

10. The cache of claim 7 wherein the selection logic identifies as the further way a second-least recently used way within the cache.

11. The cache of claim 7 wherein the selection logic examines entries within the LRU history for the selected set to identify the least recently used way, wherein the entries are ordered in a sequence determined by least recent usage of the ways to which they correspond.

12. The cache of claim 7 wherein the cache is a trace cache memory, and wherein the information item associated with the first thread comprises a microinstruction of the first thread.

13. A method including:
   configuring an N way set associative cache, associated with a multi-threaded processor, to include first and second portions comprising one or more ways dedicated to the first and second threads respectively and a third portion comprising one or more ways shared between the first and second threads;
   for an information item associated with the first thread, examining for a selected set a history of least recently used ways until one is found that is within one of the first and third portions; and
   storing the information item within the found way.

14. The method of claim 13 wherein the sharing of the third portion of the cache is performed according to resource demands of the respective first and second threads.

15. The method of claim 13, wherein the examining is performed on M ways of the history of least recently used ways, and where M>1.

16. The method of claim 13 wherein the examination of the history of least recently used ways includes examining entries within the history, each entry corresponding to a respective one of the ways, wherein the entries are ordered in a sequence determined by least recent usage of the respective ways.

17. The method of claim 13 wherein the cache is a trace cache memory, and wherein the information item associated with the first thread comprises a microinstruction of the first thread.

18. A computer storage storing a sequence of instructions that, when executed within a processor, causes the processor to perform the steps of:
dedicating a first portion comprising one or more ways of an N way set associative cache exclusively to a first thread;
dedicating a second portion comprising one or more ways of the cache exclusively to a second thread;
dynamically sharing a third portion comprising one or more ways of the cache between the first and second threads; and
performing victim selection in the cache by,
examining a Least Recently Used (LRU) history for a selected set to identify a least recently used way within the cache as a candidate way to store an information item associated with the first thread;
determining whether the candidate way is within the first or the third portion of the cache;
if the candidate way is within the first or the third portion of the cache, then storing the information associated with the first thread in the candidate way; and
if the candidate way is within the second portion of the cache, then identifying a further way within the cache as being the candidate way, wherein the further way is not the candidate way previously identified.

19. The computer storage of claim 18 wherein the dynamic sharing of the third portion of the cache is performed according to resource demands of the respective first and second threads.

20. The computer storage of claim 18 wherein the examining includes examining the LRU history to identify M least recently used ways within the cache, wherein M>1, and wherein the determining is performed for the M candidate ways, and wherein the further way is another of the M candidate ways.

21. The computer storage of claim 18 wherein the identifying of the further way as being the candidate way comprises identifying a second-least recently used way within the cache.

22. The computer storage of claim 18 wherein the examining includes examining entries within the LRU history for the selected set, each entry corresponding to a respective one of the ways, wherein the entries are ordered in a sequence determined by least recent usage of the respective ways.

23. The computer storage of claim 18 wherein the cache is a trace cache memory, and wherein the information item associated with the first thread comprises a microinstruction of the first thread.

24. A method comprising:
detecting misses in an N way set associative cache of a processor;
performing victim selection responsive to each of the misses in a manner that partitions the capacity of the cache to make a first and second portion each comprising one or more ways available for replacement respectively only by each of a first and second instruction threads while at the same time that defines a shared portion comprising one or more ways available to both the first and second instruction threads, wherein the performing victim selection responsive to each of the misses includes examining entries of a least recently used history until an available one of said ways within a selected set is found.

25. The method of claim 24, further comprising:
performing fine multithreading of the first and second threads in the processor.

26. The method of claim 24, wherein the examining includes examining M of the entries corresponding to the M least recently used of the ways, and wherein M>1.

27. The method of claim 24 wherein the shared portion of the cache is shared according to resource demands of the respective first and second threads.

28. The method of claim 24 wherein each of the entries corresponds to a respective one of the ways, and wherein the entries are ordered in a sequence determined by least recent usage of the respective ways.

29. The method of claim 24 wherein the cache is a trace cache memory to store microinstructions of the first and second instruction threads.

30. An apparatus comprising:
a processor including,
an N way set associative cache having a storage capacity, and
victim selection logic including logic to partition the storage capacity of the cache having a dedicated portion comprising one or more ways for each of a first and second instruction threads while at the same time having a shared portion comprising one or more ways accessible by both the first and second threads, wherein the victim selection logic responsive to each of the misses in the cache to examine entries of a least recently used history for a selected set of the cache until one of said ways is found that is available to the instruction thread causing that cache miss.

31. The apparatus of claim 30, wherein the cache is a trace cache and the processor is capable of fine simultaneous multithreading.

32. The apparatus of claim 30, wherein the cache is a trace cache, wherein the trace cache is to store microinstructions of the first and second threads.

33. The apparatus of claim 30 wherein the entries are ordered in a sequence determined by least recent usage of the ways to which they correspond.

34. The apparatus of claim 30 wherein the victim selection logic responsive to each of the misses in the cache to examine M entries corresponding to M least recently used ways within the cache, and wherein M>1.

35. The apparatus of claim 30 wherein the shared portion of the cache is shared according to resource demands of the respective first and second threads.

* * * * *